United States Patent
Zakharchenko et al.

(10) Patent No.: US 12,536,710 B2
(45) Date of Patent: *Jan. 27, 2026

(54) DYNAMIC MESH CODING WITH SIMPLIFIED TOPOLOGY

(71) Applicant: GUANGDONG OPPO MOBILE TELECOMMUNICATIONS CORP., LTD., Dongguan (CN)

(72) Inventors: Vladyslav Zakharchenko, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 33 days.

This patent is subject to a terminal disclaimer.

(21) Appl. No.: 18/725,374

(22) PCT Filed: Dec. 28, 2022

(86) PCT No.: PCT/US2022/082494
§ 371 (c)(1),
(2) Date: Jun. 28, 2024

(87) PCT Pub. No.: WO2023/129982
PCT Pub. Date: Jul. 6, 2023

(65) Prior Publication Data
US 2025/0166231 A1    May 22, 2025

Related U.S. Application Data

(60) Provisional application No. 63/266,175, filed on Dec. 29, 2021, provisional application No. 63/266,176, (Continued)

(51) Int. Cl.
G06T 9/00      (2006.01)
G06T 9/20      (2006.01)
G06T 17/20     (2006.01)

(52) U.S. Cl.
CPC .............. G06T 9/001 (2013.01); G06T 9/20 (2013.01); G06T 17/20 (2013.01); G06T 17/205 (2013.01);
(Continued)

(58) Field of Classification Search
None
See application file for complete search history.

(56) References Cited

U.S. PATENT DOCUMENTS 6,262,737 B1    7/2001  Li
12,315,081 B2 *  5/2025  Graziosi .................. G06T 9/00
(Continued)

OTHER PUBLICATIONS

International Search Report in the international application No. PCT/US2022/082497, mailed on Mar. 29, 2023. 2 pages.
(Continued)

*Primary Examiner* — Tyler W. Sullivan
(74) *Attorney, Agent, or Firm* — BAYES PLLC

(57) ABSTRACT

In some embodiments, a mesh encoder encodes a dynamic mesh with connectivity simplification. The encoder encodes geometry component images of the dynamic mesh using a video encoder to generate a geometry component bitstream and decodes the geometry component bitstream to generate reconstructed geometry component images. The encoder further determines, using the reconstructed geometry component images, a face to be removed from connectivity component images of the dynamic mesh and updates the connectivity component images of the dynamic mesh by removing the face from the connectivity component images. The encoder encodes the updated connectivity component images to generate a connectivity component bitstream and
(Continued)

generates a coded mesh bitstream by including at least the geometry component bitstream and the connectivity component bitstream.

14 Claims, 25 Drawing Sheets

Related U.S. Application Data filed on Dec. 29, 2021, provisional application No. 63/295,138, filed on Dec. 30, 2021.

(52) U.S. Cl.
CPC ...... *G06T 2210/36* (2013.01); *G06T 2210/56* (2013.01)

(56) References Cited

U.S. PATENT DOCUMENTS

| | | | |
|---|---|---|---|
| 2007/0194975 | A1 | 8/2007 | Jang |
| 2012/0262444 | A1 | 10/2012 | Stefanoski |
| 2013/0114910 | A1 | 5/2013 | Mammou |
| 2020/0286261 | A1 | 9/2020 | Faramarzi |
| 2021/0090301 | A1 | 3/2021 | Mammou |
| 2022/0164994 | A1* | 5/2022 | Joshi ............... G06T 9/001 |

OTHER PUBLICATIONS

Written Opinion of the International Search Authority in the international application No. PCT/US2022/082497, mailed on Mar. 29, 2023. 11 pages.
Peng, J., Kim, C.-S., & Jay Kuo, C.-C. (2005). Technologies for 3D mesh compression: A survey. Journal of Visual Communication and Image Representation, Apr. 16, 2005, doi: 10.1016/j.jvcir.2005.03.001. pp. 688-733. 46 pages.
E. Faramarzi, R. Joshi and M. Budagavi, "Mesh Coding Extensions to MPEG-I V-PCC," 2020 IEEE 22nd International Workshop on Multimedia Signal Processing (MMSP), 2020, pp. 1-5, doi: 10.1109/MMSP48831.2020.9287057. 5 pages.
J. Rossignac, "Edgebreaker: connectivity compression for triangle meshes," in IEEE Transactions on Visualization and Computer Graphics, vol. 5, No. 1, pp. 47-61, Jan.-Mar. 1999, doi: 10.1109/2945.764870. 15 pages.
Mamou, Khaled & Zaharia, Titus & Prêteux, Françoise. (2009). TFAN: A low complexity 3D mesh compression algorithm. Journal of Visualization and Computer Animation. 20. pp. 343-354. DOI: 10.1002/cav.319. 12 pages.
Rowenhorst, D & Rollett, A.D. & Rohrer, G & Groeber, M & Jackson, M & Konijnenberg, Peter & Graef, M.. (2015). Consistent representations of and conversions between 3D rotations. Modelling and Simulation in Materials Science and Engineering. 23. 10.1088/0965-0393/23/8/083501. the whole document. 23 pages.
International Search Report in the international application No. PCT/US2022/082500, mailed on Jun. 28, 2023. 11 pages.
Written Opinion of the International Search Authority in the international application No. PCT/US2022/082500, mailed on Jun. 28, 2023. 9 pages.
Graziosi, D. B. (2021). Video-Based Dynamic Mesh Coding. 2021 IEEE International Conference on Image Processing (ICIP). doi:10.1109/icip42928.2021.9506298, Sep. 22, 2021 (Sep. 22, 2021). the whole document. 5 pages.
Schwarz, S., Preda, M., Baroncini, V., Budagavi, M., Cesar, P., Chou, P. A., . . . Zakharchenko, V. (2019). Emerging MPEG Standards for Point Cloud Compression. IEEE Journal on Emerging and Selected Topics in Circuits and Systems, 9(1), 133-148. doi: 10.1109/jetcas.2018.2885981, Apr. 2023 (Apr. 11, 2023). the whole document. 16 pages.
Jasak et al. "Dynamic mesh handling in OpenFOAM applied to fluid-structure interaction simulations." Proceedings of the V European Conference on Computational Fluid Dynamics ECCOMAS CFD 2010, J. C. F. Pereira and A. Sequeira (Eds), Lisbon, Portugal, Jun. 14-17, 2010. the whole document. 19 pages.
International Search Report in the international application No. PCT/US2022/082494, mailed on Mar. 30, 2023. 2 pages.
Written Opinion of the International Search Authority in the international application No. PCT/US2022/082494, mailed on Mar. 30, 2023. 11 pages.
Crowle, S., Doumanoglou, A., Poussard, B., Boniface, M., Zarpalas, D., & Daras, P. (2015). Dynamic adaptive mesh streaming for real-time 3D teleimmersion. Proceedings of the 20th International Conference on 3D Web Technology—Web3D '15. doi: 10.1145/2775292.2775296, Jun. 18, 2015 (Jun. 18, 2015). pp. 269-277. 9 pages.
Pourazad et al. An H.264-based video encoding scheme for 3D TV. 14th European Signal Processing Conference (EUSIPCO 2006), Florence, Italy, Sep. 4-8, 2006, copyright by EURASIP. the whole document. 5 pages.
International Search Report in the international application No. PCT/US2022/082498, mailed on May 30, 2023. 11 pages.
Written Opinion of the International Search Authority in the international application No. PCT/US2022/082498, mailed on May 30, 2023. 9 pages.
Lengyel. "Compression of time-dependent geometry." Proceedings of the 1999 symposium on Interactive 3D graphics. 1999. the whole document. 8 pages.
Pan et al. "Deep mesh reconstruction from single rgb images via topology modification networks." Proceedings of the IEEE/CVF International Conference on Computer Vision. 2019, DOI 10.1109/ICCV.2019.01006. the whole document. 10 pages.

* cited by examiner

400

```
# ----------------------------------
# Part 1 :
# geometry information
# X  Y  Z  a_1 a_2 a_3
# vertex 0 (v_idx_0)
v  0.0 0.0 0.0 127 127 127
# vertex 1 (v_idx_1)
v  1.0 0.0 0.0 127 127 127
# vertex 2 (v_idx_2)
v  0.0 1.0 0.0 127 127 127
# vertex 3 (v_idx_3)
v  0.0 0.0 1.0 127 127 127
# ----------------------------------
# Part 2 :
# connectivity information
# v_idx, v_idx, v_idx
# face 0 (f_idx_0)
f  0    1    2
# face 1 (f_idx_1)
f  0    3    1
# face 2 (f_idx_2)
f  0    2    3
# ----------------------------------
```

406

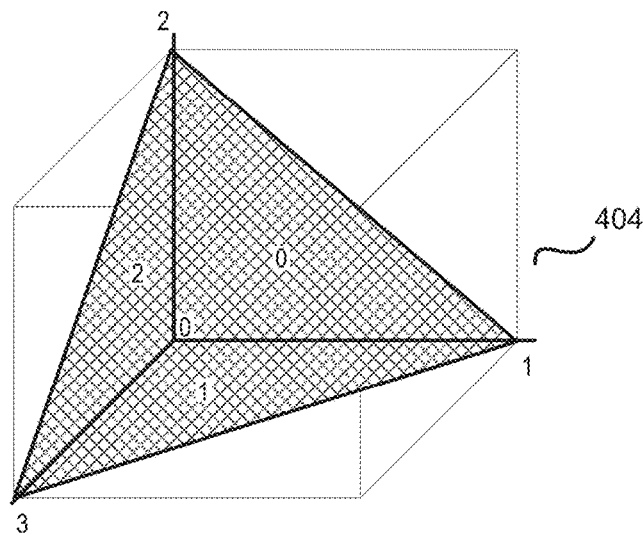

404

402

```
#Geometry and Attributes
# Vertex list
X Y Z R G B vertex number 0
1 1 1 20 20 20
# vertex number 1
1 0 0 10 10 10
# vertex number 2
1 1 0 20 10 10
# vertex number 3
1 0 1 10 10 10
```

```
# Connectivity
# face list
# v_idx_s[j,k,i,0], v_idx_s[j,k,i,1], v_idx_s[j,k,i,2]

# face number 0
0 1 2
# face number 1
1 2 3
# face number 2
0 1 3
```

FIG. 4

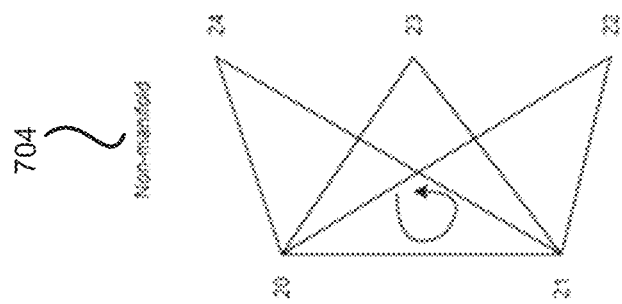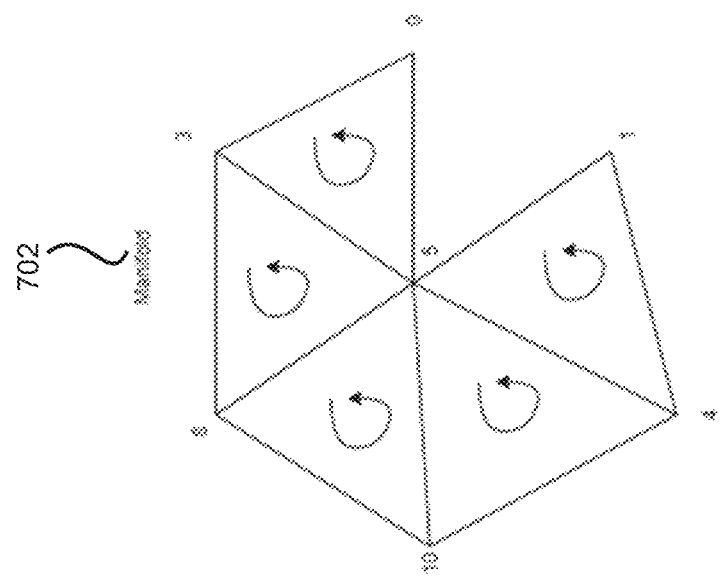
FIG. 7

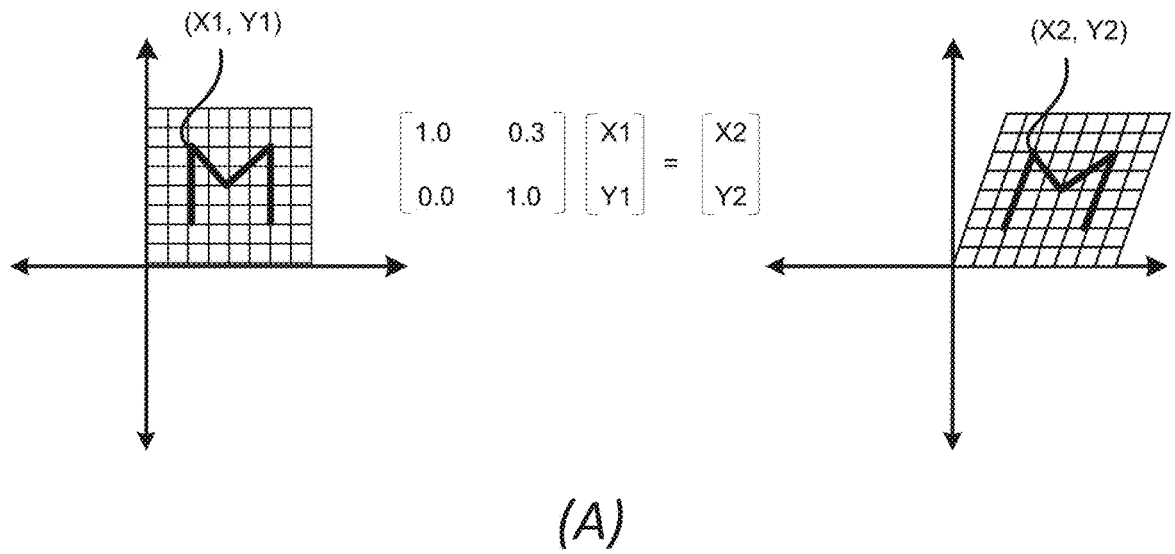
(A)
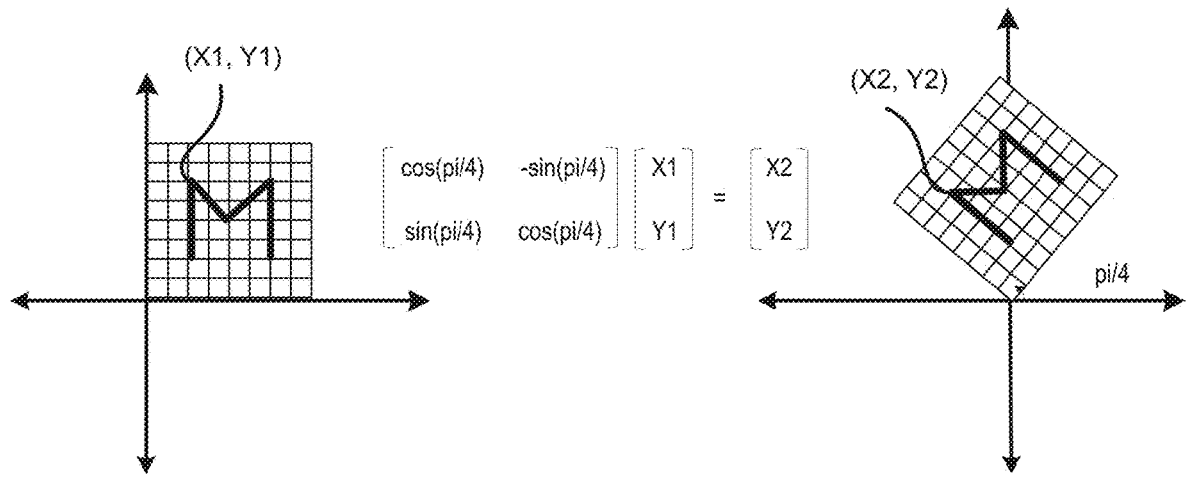
(B)
*FIG. 17*

DYNAMIC MESH CODING WITH SIMPLIFIED TOPOLOGY

CROSS-REFERENCE TO RELATED APPLICATIONS

This application is a national stage application of International Application No. PCT/US2022/082494, filed on Dec. 28, 2022, which claims priority to U.S. Provisional Application No. 63/266,176, entitled "Topology Coding Method and Apparatus for Dynamic Mesh Coding," filed on Dec. 29, 2021, U.S. Provisional Application No. 63/295,138, entitled "Attribute Adjustment Method and Apparatus for Dynamic Mesh Coding with Simplified Topology," filed on Dec. 30, 2021, and U.S. Provisional Application No. 63/266,175, entitled "Attribute Reconstruction Filter for Dynamic Mesh Coding with Simplified Topology," filed on Dec. 29, 2021, all of which are hereby incorporated in their entireties by this reference.

TECHNICAL FIELD

This disclosure relates generally to computer-implemented methods and systems for dynamic mesh coding. Specifically, the present disclosure involves dynamic mesh coding with simplified topology.

BACKGROUND 3D graphics technologies are integrated in various applications, such as entertainment applications, engineering applications, manufacturing applications, and architecture applications. In these various applications, 3D graphics may be used to generate 3D models of incredible detail and complexity. Given the detail and complexity of the 3D models, the data sets associated with the 3D models can be extremely large. Furthermore, these extremely large data sets may be transferred, for example, through the Internet. Transfer of large data sets, such as those associated with detailed and complex 3D models, can therefore become a bottleneck in various applications. As illustrated by this example, developments in 3D graphics technologies provide improved utility to various applications but also present technological challenges. Improvements to 3D graphics technologies, therefore, represent improvements to the various technological applications to which 3D graphics technologies are applied. Thus, there is a need for technological improvements to address these and other technological problems related to 3D graphics technologies.

SUMMARY

Some embodiments involve dynamic mesh coding with simplified topology. In one example, a computer-implemented method for encoding three-dimensional (3D) content represented by a dynamic mesh includes encoding geometry component images of the dynamic mesh using a video encoder to generate a geometry component bitstream; decoding the geometry component bitstream to generate reconstructed geometry component images; determining, using the reconstructed geometry component images, a face to be removed from connectivity component images of the dynamic mesh; updating the connectivity component images of the dynamic mesh by removing the face from the connectivity component images; encoding the updated connectivity component images to generate a connectivity component bitstream; and generating a coded mesh bitstream by including at least the geometry component bitstream and the connectivity component bitstream.

In another example, a non-transitory computer-readable medium has program code that is stored thereon and the program code is executable by one or more processing devices for performing operations. The operations include encoding geometry component images of a dynamic mesh using a video encoder to generate a geometry component bitstream; decoding the geometry component bitstream to generate reconstructed geometry component images; determining, using the reconstructed geometry component images, a face to be removed from connectivity component images of the dynamic mesh; updating the connectivity component images of the dynamic mesh by removing the face from the connectivity component images; encoding the updated connectivity component images to generate a connectivity component bitstream; and generating a coded mesh bitstream by including at least the geometry component bitstream and the connectivity component bitstream.

In another example, a system includes a processing device and a non-transitory computer-readable medium communicatively coupled to the processing device. The processing device is configured to execute program code stored in the non-transitory computer-readable medium and thereby perform operations. The operations include encoding geometry component images of a dynamic mesh using a video encoder to generate a geometry component bitstream; decoding the geometry component bitstream to generate reconstructed geometry component images; determining, using the reconstructed geometry component images, a face to be removed from connectivity component images of the dynamic mesh; updating the connectivity component images of the dynamic mesh by removing the face from the connectivity component images; encoding the updated connectivity component images to generate a connectivity component bitstream; and generating a coded mesh bitstream by including at least the geometry component bitstream and the connectivity component bitstream.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 illustrates an example of a mesh frame and its underlying defining data associated with color-per-vertex approaches and a corresponding 3D content, according to various embodiments of the present disclosure.

FIG. 7 illustrates an example associated with determining face orientation in various 3D coding approaches, according to various embodiments of the present disclosure.

FIG. 17 shows examples of the affine transformations, according to various embodiments of the present disclosure.

DETAILED DESCRIPTION

Figure 1:
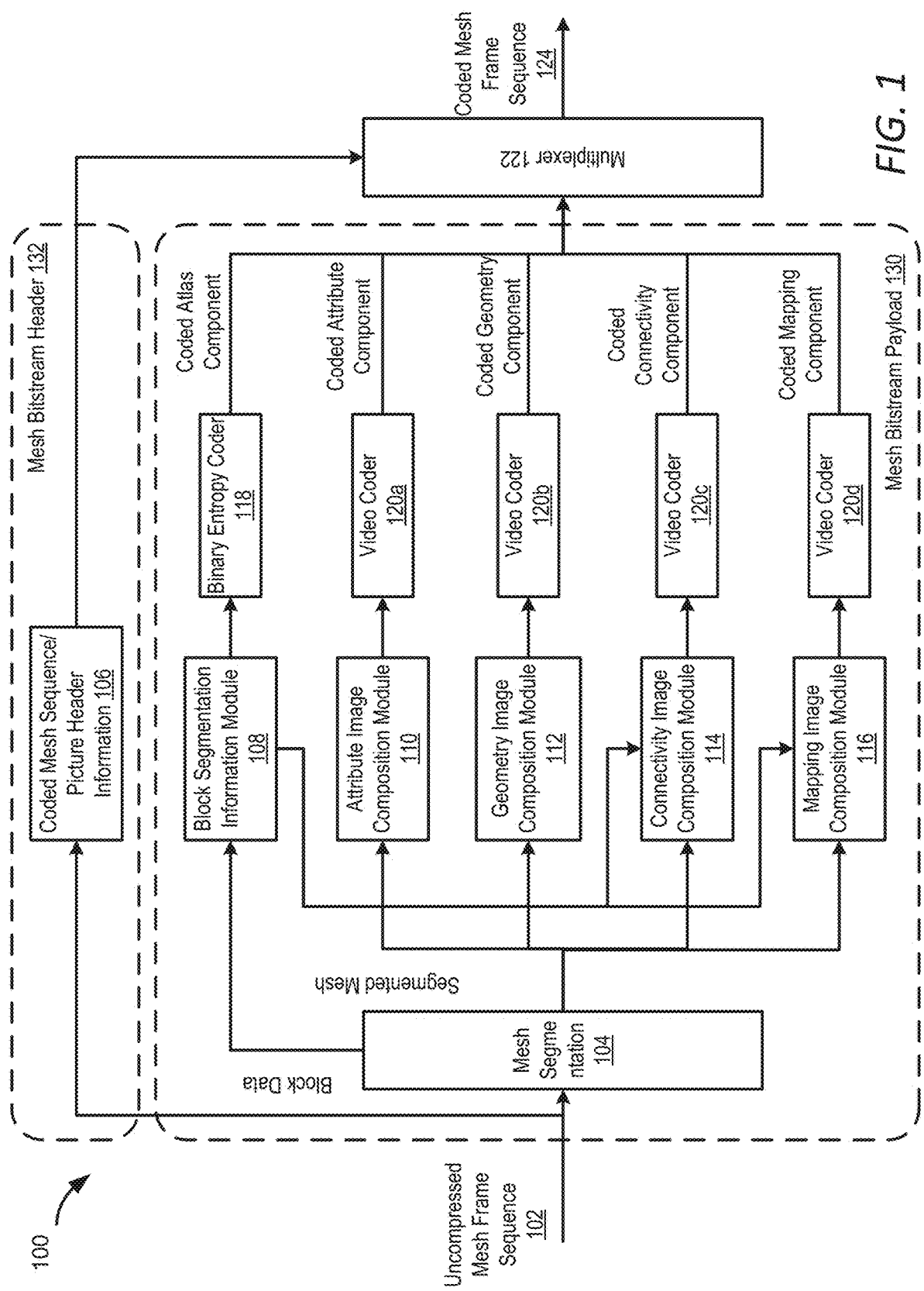
FIG. 1 illustrates an example encoder system for mesh coding, according to various embodiments of the present disclosure.

Various embodiments provide dynamic mesh coding with simplified topology to improve coding efficiency. Due to the lossy nature of mesh encoding, some information may be distorted during the encoding, such as the geometry information which describes the coordinates of the vertices of the mesh. As such, the reconstructed position of the decoded vertexes of the mesh may differ from the original positions of the vertices. As a result, neighboring faces may degenerate into simplified geometry. Such degenerate can be utilized to simplify the topology information contained in the connectivity data without introducing much further distortions, thereby reducing the amount the data to be encoded and increasing the coding efficiency. Various embodiments described herein involve the encoding and decoding of dynamic mesh with simplified connectivity information.

The following non-limiting examples are provided to introduce some embodiments. In one embodiment, a mesh encoder accesses a dynamic mesh to be encoded. The dynamic mesh may be represented as uncompressed mesh frame sequence that include mesh frames. Each mesh frame includes at least one mesh tile or mesh slice which includes data that describes 3D content (e.g., 3D objects) in a digital representation as a collection of geometry, connectivity, attribute, and attribute mapping information. The encoder can extract an attribute component (containing color information), a geometry component (containing a list of vertex coordinates), a connectivity component (containing a list of faces with corresponding vertex index and texture index), and a mapping component (containing a list of projected vertex attribute coordinate information) from the uncompressed mesh frame sequence.

The encoder encodes the geometry component and further decodes the encoded geometry component to generate the reconstructed geometry information. The encoder determines vertices in the reconstructed geometry information that can be removed from the connectivity component due to the degeneration caused by encoding distortions. The encoder further identifies neighboring faces that can be merged if the vertices were removed. The encoder updates the connectivity component of the dynamic mesh to simplify the connectivity information to replace the faces with the merged faces. The encoder encodes the updated connectivity component to generate a connectivity component bitstream. The encoder further encodes other components and generates a coded mesh bitstream by including the encoded components.

By merging faces and removing vertices, the connectivity component contains less data and thus the encoded connectivity component requires fewer bits to represent than the original connectivity component. As a result, the size of the overall coded mesh bitstream is also smaller than that of the mesh bitstream coded without the connectivity simplification. In addition, because the to-be-removed vertices are selected in a way that leads to small distortions (e.g., a vertex having the smallest distance to a face edge is selected to be removed), the visual artifacts introduced through the simplification process is minimized. As such, the coded mesh bitstream can be decoded using a regular mesh decoder without knowing that the coded mesh bitstream is generated with the simplified connectivity information.

In another embodiment, the coded mesh bitstream with simplified connectivity can be decoded using a mesh decoder with connectivity refinement to further reduce the distortions and visual artifacts introduced by the connectivity simplification at the encoding side. To perform the connectivity refinement, the mesh decoder can be configured with a connectivity refinement module to recover the faces that have been merged during the connectivity simplification. Based on the reconstructed geometry information, the decoder identifies vertices located within a face specified by the reconstructed connectivity information and divides the face into two or more faces according to the locations of the vertices to generate refined connectivity information. The refined connectivity information is used to reconstruct the dynamic mesh along with other decoded components of the mesh. Because of the refinement process, the connectivity information used to reconstruct the mesh is closer to the connectivity information before the connectivity simplification at the encoding. As a result, the reconstructed mesh has smaller distortions and fewer visual artifacts than the mesh decoded by a regular mesh decoder.

In another embodiment, in addition to the connectivity simplification, the mesh encoder can further reproject the attribute image in accordance with the distortions introduced by geometry information encoding and reconstruction. The distortions can be described with a transformation which is applied to a point that belongs to the edge between the two neighboring triangles that are degenerated and merged during the connectivity simplification. As such, the reprojection process can be implemented as the same transformation applied to the face in the attribute image that corresponds to the degenerated triangular face. Likewise, the mapping information can also be updated to be consistent with the connectivity information. Updating the attribute image and the mapping information in this way reduces the visual artifacts caused by the geometry information reconstruction error.

In a further embodiment, instead of updating the attribute image according to the geometry information reconstruction distortion at the encoder side, the attribute image is refined at the decoder side. A similar process to the previous embodiment can be utilized to estimate the transformation and an inverse of the estimated transformation can be applied to the decoded attribute image before the attribute image being used to reconstruct the dynamic mesh. Compared with the previous embodiment where the attribute image is updated at the encoder, this embodiment allows the mesh to be encoded faster with less computational resource consumption. The burden is shifted to the decoder where the timing requirement is less stringent and computing capability is more powerful than the encoder. As such, this embodiment is more suitable for applications like living streaming.

Descriptions of the various embodiments provided herein may include one or more of the terms listed below. For illustrative purposes and not to limit the disclosure, exemplary descriptions of the terms are provided herein.

Mesh: a collection of vertices, edges, and faces that may define the shape/topology of a polyhedral object. The faces may include triangles (e.g., triangle mesh).

Mesh slice: a collection of vertices, edges, and faces that may define the shape/topology of a polyhe. A mesh frame consists of several mesh slices.

Dynamic mesh: a mesh with at least one of various possible components (e.g., connectivity, geometry, mapping, vertex attribute, and attribute map) varying in time.

Animated Mesh: a dynamic mesh with constant connectivity.

Connectivity: a set of vertex indices describing how to connect the mesh vertices to create a 3D surface (e.g., geometry and all the attributes may share the same unique connectivity information).

Geometry: a set of vertex 3D (e.g., x, y, z) coordinates describing positions associated with the mesh vertices. The coordinates (e.g., x, y, z) representing the positions may have finite precision and dynamic range.

Mapping: a description of how to map the mesh surface to 2D regions of the plane. Such mapping may be described by a set of UV parametric/texture (e.g., mapping) coordinates associated with the mesh vertices together with the connectivity information.

Vertex attribute: a scalar of vector attribute values associated with the mesh vertices.

Attribute Map: attributes associated with the mesh surface and stored as 2D images/videos. The mapping between the videos (e.g., parametric space) and the surface may be defined by the mapping information.

Vertex: a position (e.g., in 3D space) along with other information such as color, normal vector, and texture coordinates.

Edge: a connection between two vertices.

Face: a closed set of edges in which a triangle face has three edges defined by three vertices. Orientation of the face may be determined using a "right-hand" coordinate system.

Orientation of a face: defined by vertex order in the face. Some transpositions are allowed, while other transpositions of the vertexes in the face lead to a different orientation.

Surface: a collection of faces that separates the three-dimensional object from the environment.

Connectivity Coding Unit (CCU): a square unit of size N×N connectivity coding samples that carry connectivity information.

Connectivity Coding Sample: a coding element of the connectivity information calculated as a difference of elements between a current face and a predictor face.

Block: a representation of the mesh segment as a collection of connectivity coding samples represented as three attribute channels. A block may consist of CCUs.

bits per point (bpp): an amount of information in terms of bits, which may be required to describe one point in the mesh.

3D content, such as 3D graphics, can be represented as a mesh (e.g., 3D mesh content). The mesh can include vertices, edges, and faces that describe the shape or topology of the 3D content. The mesh can be segmented into blocks (e.g., segments, tiles). For each block, the vertex information associated with each face can be arranged in order (e.g., descending order). With the vertex information associated with each face arranged in order, the faces are arranged in order (e.g., ascending order). The sorted faces in each block can be packed into two-dimensional (2D) frames. Sorting the vertex information can guarantee an increasing order of vertex indices, facilitating improved processing of the mesh. Components of the connectivity information in the 3D mesh content can be transformed from one-dimensional (1D) connectivity components (e.g., list, face list) to 2D connectivity images (e.g., connectivity coding sample array). With the connectivity information in the 3D mesh content transformed to 2D connectivity images, video encoding processes can be applied to the 2D connectivity images (e.g., as video connectivity frames). In this way, 3D mesh content can be efficiently compressed and decompressed by leveraging video encoding solutions. 3D mesh content encoded in accordance with these approaches can be efficiently decoded. Connectivity components can be extracted from a coded dynamic mesh bitstream and decoded as a frame (e.g., image). Connectivity coding samples, which correspond with pixels in the frame, are extracted. The 3D mesh content can be reconstructed from the connectivity information extracted.

A coded bitstream for dynamic mesh is represented as a collection of components, which is composed of mesh bitstream header and data payload. The mesh bitstream header can include the sequence parameter set, picture parameter set, adaptation parameters, tile information parameters, and supplemental enhancement information, etc. The mesh bitstream payload can include the coded atlas information component (auxiliary information required to convert the local coordinate system of the block to the global coordinate system of the mesh frame), coded attribute information component, coded geometry (position) information component, coded mapping information component, and coded connectivity information component.

FIG. 1 illustrates an example encoder system 100 for mesh coding, according to various embodiments of the present disclosure. As illustrated in FIG. 1, an uncompressed mesh frame sequence 102 can be input to the encoder system 100, and the example encoder system 100 can generate a coded mesh frame sequence 124 based on the uncompressed mesh frame sequence 102. In general, a mesh frame sequence includes mesh frames. A mesh frame is a data format that describes 3D content (e.g., 3D objects) in a digital representation as a collection of geometry, connectivity, attribute, and attribute mapping information. Each mesh frame is characterized by a presentation time and duration. A mesh frame sequence (e.g., sequence of mesh frames) forms a dynamic mesh video.

As illustrated in FIG. 1, the encoder system 100 can generate coded mesh sequence/picture header information 106 based on the uncompressed mesh frame sequence 102. The coded mesh sequence/picture header information 106 can include picture header information such as sequence parameter set (SPS), picture parameter set (PPS), slice header (SH) and supplemental enhancement information (SEI). A mesh bitstream header 132 can include the coded mesh sequence/picture header information 106. The uncompressed mesh frame sequence 102 can be input to the mesh segmentation module 104. The mesh segmentation module 104 segments the uncompressed mesh frame sequence 102 into block data and segmented mesh data. A mesh bitstream payload 130 can include the block data and the segmented mesh data. The mesh bitstream header 132 and the mesh bitstream payload 130 can be multiplexed together by the multiplexer 122 to generate the coded mesh frame sequence 124.

The encoder system 100 can include a block segmentation information module 108 to generate block segmentation information (e.g., atlas information) based on the block data. Based on the segmented mesh data, the encoder system 100 can generate uncompressed attribute component using an attribute image composition module 110, uncompressed geometry component using a geometry image composition module 112, uncompressed connectivity component using a connectivity image composition module 114, and uncompressed mapping component using a mapping image composition module 116. As illustrated in FIG. 1, the connectivity image composition module 114 and the mapping image composition module 116 can also use the block segmentation information generated by the block segmentation information module 108 when generating the respective components. As an example of the information generated, the block segmentation information can include binary atlas information. The attribute image component can include RGB and YUV component information (e.g., RGB 4:4:4, YUV 4:2:0). The geometry component can include the 3D coordinates of the vertex information in canonical or local coordinate system (e.g., XYZ 4:4:4, XYZ 4:2:0). The connectivity component can include vertex indices and texture vertex information (e.g., dv0, dv1, dv2 4:4:4). The mapping component can include texture vertex information (e.g., UV 4:4:X). These generated components may be represented as images.

The block segmentation information can be provided to a binary entropy coder 118 to generate atlas component. The binary entropy coder 118 may be a lossless coder which allows the encoded information to be recovered without any distortion. The uncompressed attribute component generated by the attribute image composition module 110 and represented as images can be provided to a video coder 120a to generate the coded attribute component. The video coder 120a may be a lossy coder where the encoded information may not be fully recovered at the decoder side. Similarly, the geometry component represented as images can be provided to a video coder 120b to generate coded geometry component. The video coder 120b may also be a lossy encoder. The connectivity image component represented as images can be provided to video coder 120c to generate coded connectivity component. The video coder 120c may be a lossless encoder. The mapping component represented as images can be provided to video coder 120d to generate coded mapping component. The video coder 120d may be a lossless encoder. The video coders 120a-120d may be any video or image encoder that can compress the information in a video sequence or images to reduce the size of the video, such as the H.264 video encoder, H.265 video encoder, H.266 video encoder, JPEG image encoder, and so on. The video coders 120a-120d may use the same type or different types of video encoders. A mesh bitstream payload 130 can include the atlas component, the attribute component, the geometry component, the connectivity component, and the mapping component. The mesh bitstream payload and the mesh bitstream header are multiplexed together by the multiplexer 122 to generate the coded mesh frame sequence 124.

Figure 2:
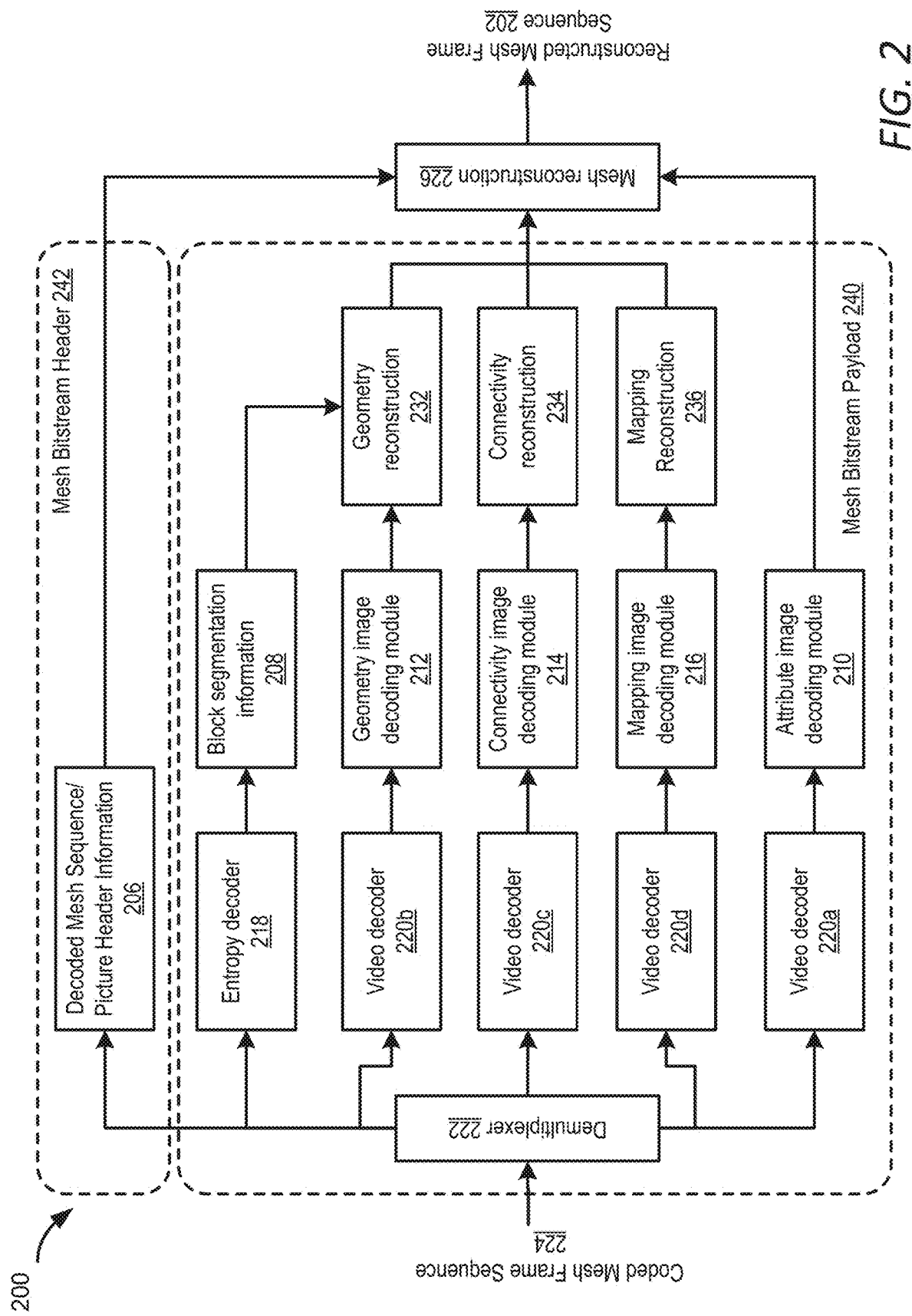
FIG. 2 illustrates an example decoder system for mesh decoding, according to various embodiments of the present disclosure.

FIG. 2 illustrates an example decoder system 200 for mesh decoding, according to various embodiments of the present disclosure. As illustrated in FIG. 2, a coded mesh frame sequence 224, such as the coded mesh frame sequence 124 generated by the encoder system 100 in FIG. 1 can be input to the decoder system 200. The coded mesh frame sequence 224 may be a bitstream. The example decoder system 200 can generate a reconstructed mesh frame sequence 202 based on the coded mesh frame sequence 224.

As illustrated in FIG. 2, the decoder system 200 de-multiplexes the coded mesh frame sequence 224 using a de-multiplexer 222 to identify various components of the coded information, including the coded mesh sequence/picture/slice header information 206 and the coded block segmentation information, which can be decoded using an entropy decoder 218. The de-multiplexed information further includes the coded geometry component, the coded connectivity image component, the coded mapping component, and the coded attribute component. The identified various coded component can be decoded using video decoders 220a-220d corresponding to the respective video encoders used to encode the information as indicated in coded mesh sequence header 106, such as video coders 120a-120d. Similar to the video coders 120a-120d, the video decoders 220a-220d can be any video decoder or image decoder.

The video decoded data can further be processed using the respective processing modules, such as the attribute image decoding module 210, the geometry image decoding module 212, the connectivity image decoding module 214, and the mapping image decoding module 216. These decoding modules convert the decoded video data into the respective formats of the data. For example, for geometry data, the decoded images in the video can be reformatted back into canonical XYZ 3D coordinates to generate the geometry data. Likewise, the decoded connectivity video/images can be reformatted into connectivity coded samples dv0, dv1, dv2 to generate the decoded connectivity data; the decoded mapping video/images can be reformatted into uv coordinates to generate the decoded mapping data; and the decoded attribute video/images can be used to generate the RGB or YUV attribute data of the mesh.

The geometry reconstruction module 232 reconstructs the geometry information from the decoded 3D coordinates; the connectivity reconstruction module 234 reconstructs the topology (e.g., faces) from the decoded connectivity data; and the mapping reconstruction module 236 reconstructs the attribute mapping from the decoded mapping data. With the reconstructed geometry information, faces, mapping data, attribute data, and the decoded mesh sequence/picture header information 206, a mesh reconstruction module 226 reconstructs the mesh to generate the reconstructed mesh frame sequence 202.

Figure 3:
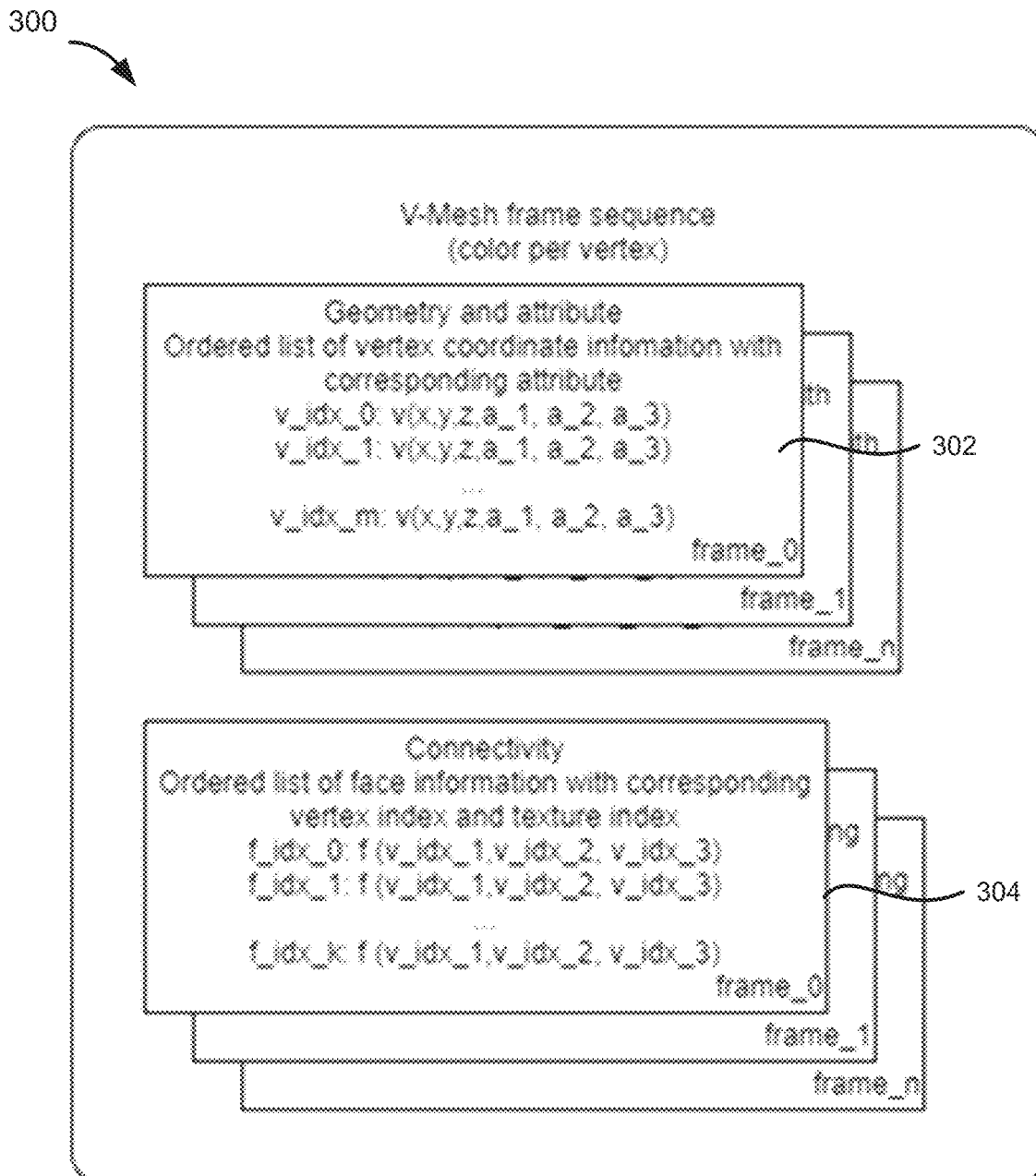
FIG. 3 illustrates example mesh frames associated with color-per-vertex approaches, according to various embodiments of the present disclosure.

FIGS. 3-7 illustrate examples associated with coding and decoding information for a mesh, according to various embodiments of the present disclosure. In various approaches to coding 3D content, geometry, attribute, and connectivity information are encoded in mesh frames. For example, in color-per-vertex approaches, attribute information is stored with the geometry information and connectivity information are stored in mesh frames with associated vertex indices. FIG. 3 illustrates example mesh frames 300 associated with color-per-vertex approaches, according to various embodiments of the present disclosure. As illustrated in FIG. 3, geometry and attribute information 302 can be stored in mesh frames as an ordered list of vertex coordinate information. Each vertex coordinate is stored with corresponding geometry and attribute information. Connectivity information 304 can be stored in mesh frames as an ordered list of face information, with each face including corresponding vertex indices and texture indices.

FIG. 4 illustrates an example 400 of a mesh frame 402 and its underlying defining data 406 associated with color-per-vertex approaches and a corresponding 3D content 404, according to various embodiments of the present disclosure. As illustrated in mesh frame 402 and defined in the corresponding data 406, geometry coordinates with associated attribute information as well as connectivity information are stored in a mesh frame, with geometry and attribute information stored as an ordered list of vertex geometry coordinate information with associated attribute information and connectivity information stored as an ordered list of face information with corresponding vertex indices. The geometry and attribute information illustrated in mesh frame 402 includes four vertices. The positions of the vertices are indicated by X, Y, Z coordinates and color attributes are indicated by a_1, a_2, a_3 values that represent the R, G, B color prime values. The connectivity information illustrated in mesh frame 402 includes three faces. Each face includes three vertex indices listed in the geometry and attribute information to form a triangle face. By using the vertex indices for each corresponding face to point to the geometry and attribute information stored for each vertex coordinate, the 3D content 404 (e.g., 3D triangle) can be decoded based on the mesh frames 402.

Figure 5:
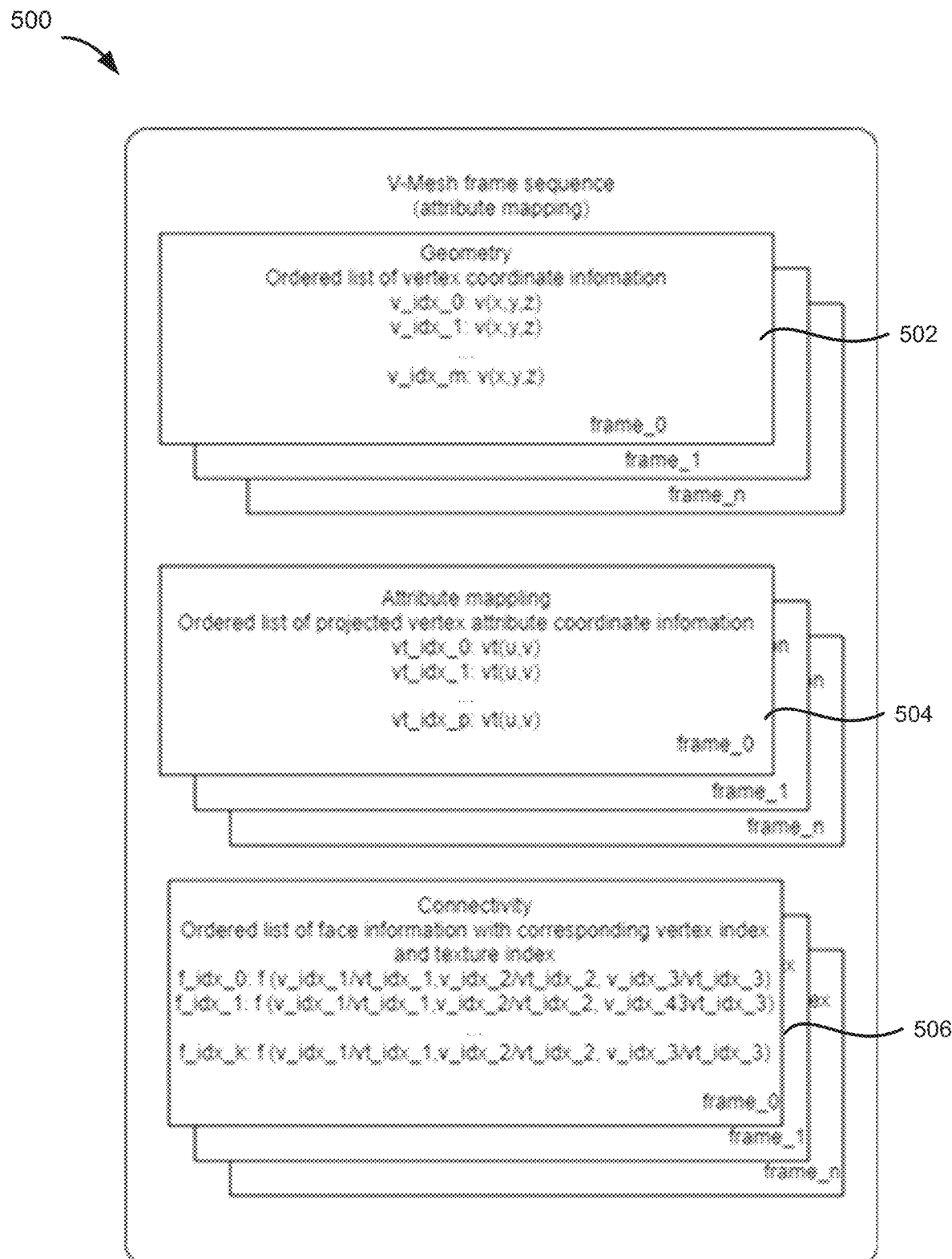
FIG. 5 illustrates example mesh frames associated with 3D coding approaches using vertex maps, according to various embodiments of the present disclosure.

FIG. 5 illustrates example uncompressed mesh frames 500 associated with 3D coding approaches using texture maps, according to various embodiments of the present disclosure. As illustrated in FIG. 5, geometry information 502 can be stored in mesh frames as an ordered list of vertex coordinate information. Each vertex coordinate is stored with corresponding geometry information. Attribute information 504 can be stored in mesh frames, separate from the geometry information 502, as an ordered list of projected vertex attribute coordinate information. The projected vertex attribute coordinate information is stored as 2D coordinate information with corresponding attribute information. Connectivity information 506 can be stored in mesh frames as an ordered list of face information, with each face including corresponding vertex indices and texture indices. In some examples, the mesh frames are formatted according to the wavefront OBJ file format.

Figure 6:
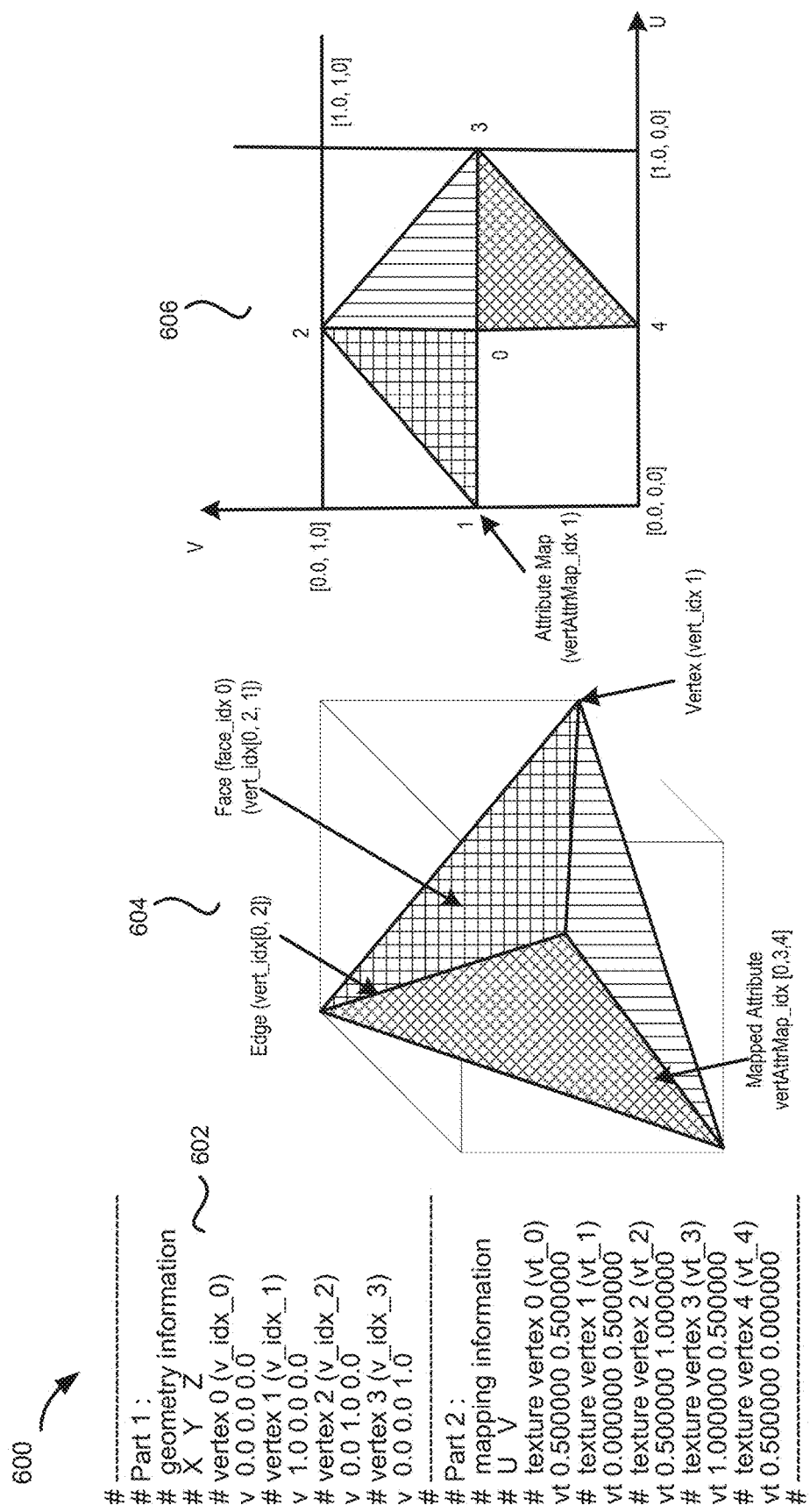
FIG. 6 illustrates an example of data defining a mesh frame, a corresponding 3D content, and a corresponding attribute map associated with 3D coding approaches using attribute mapping, according to various embodiments of the present disclosure.

FIG. 6 illustrates an example 600 of data 602 defining a mesh frame, a corresponding 3D content 604, and a corresponding attribute map 606 associated with 3D coding approaches using attribute mapping, according to various embodiments of the present disclosure. As illustrated in FIG. 6, geometry information, mapping information (e.g., attribute information), and connectivity information are stored in the mesh frame generated based on information described in data 602. The geometry information contained in the mesh frame includes four vertices. The positions of the vertices are indicated by X, Y, Z coordinates. The mapping information in the mesh frame includes five texture vertices. The positions of the texture vertices are indicated by U, V coordinates. The connectivity information in the mesh frame includes three faces. Each face includes three pairs of vertex indices and texture vertex coordinates. As illustrated in FIG. 6, by using the pairs of vertex indices and texture vertex coordinates for each face, the 3D content 604 (e.g., the object formed by the triangles in the 3D space) and the attribute map 606 can be decoded based on the mesh frame. Attribute information associated with the attribute map 606 can be applied to the 3D content 604 to apply the attribute information to the 3D content 604. In this example, the coordinates are normalized on a scale from −1.0 to +1.0 for each axis in geometry, and for attribute mapping the coordinates are normalized on a scale from 0.0 to +1.0. The coordinates in the mesh encoder are first converted from a floating-point value to a fixed point representation with a given bit-depth and then compressed by the mesh encoder.

FIG. 7 illustrates an example 700 associated with determining face orientation in various 3D coding approaches, according to various embodiments of the present disclosure. As illustrated in FIG. 7, face orientation can be determined using a right-hand coordinate system. Each face illustrated in the example 700 includes three vertices, forming three edges. Each face is described by the three vertices. In a manifold mesh 702, each edge belongs to at most two different faces. In a non-manifold mesh 704, an edge can belong to two or more different faces. In both cases of the manifold mesh 702 and the non-manifold mesh 704, the right-hand coordinate system can be applied to determine the orientation of a face, which may also be referred to as a normal vector direction or a face normal direction.

Figure 8:
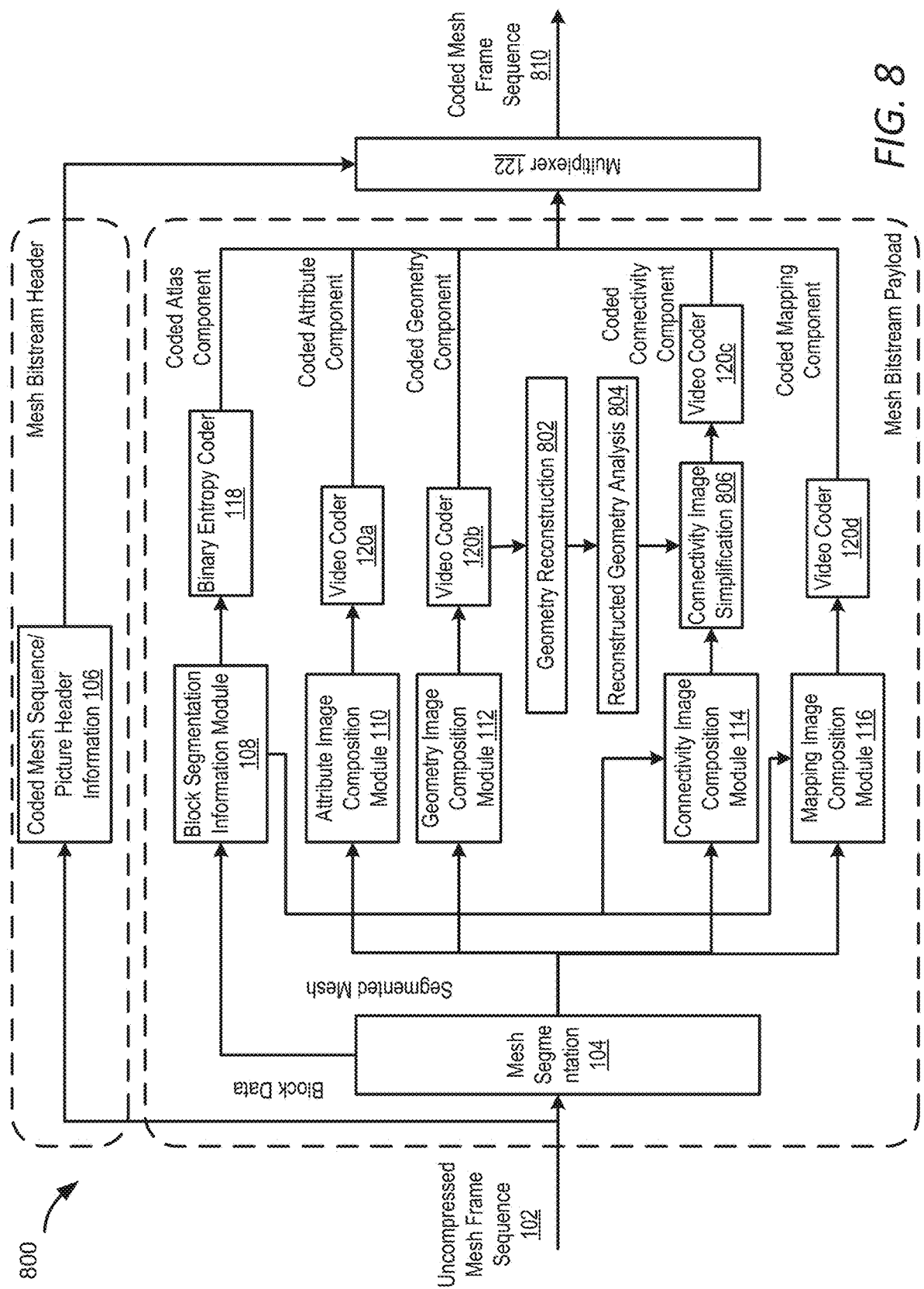
FIG. 8 illustrates an example of an encoder system for mesh coding with connectivity simplification, according to various embodiments of the present disclosure.

FIG. 8 illustrates an example of an encoder system 800 for mesh coding with connectivity simplification, according to various embodiments of the present disclosure. The encoder system 800 shown in FIG. 8 includes various components or modules that are similar to those in FIG. 1. In addition, the encoder system 800 includes a geometry reconstruction module 802, a reconstructed geometry analysis module 804, and a connectivity image simplification module 806 to simplify the connectivity information before encoding to improve the coding efficiency.

Figure 9:
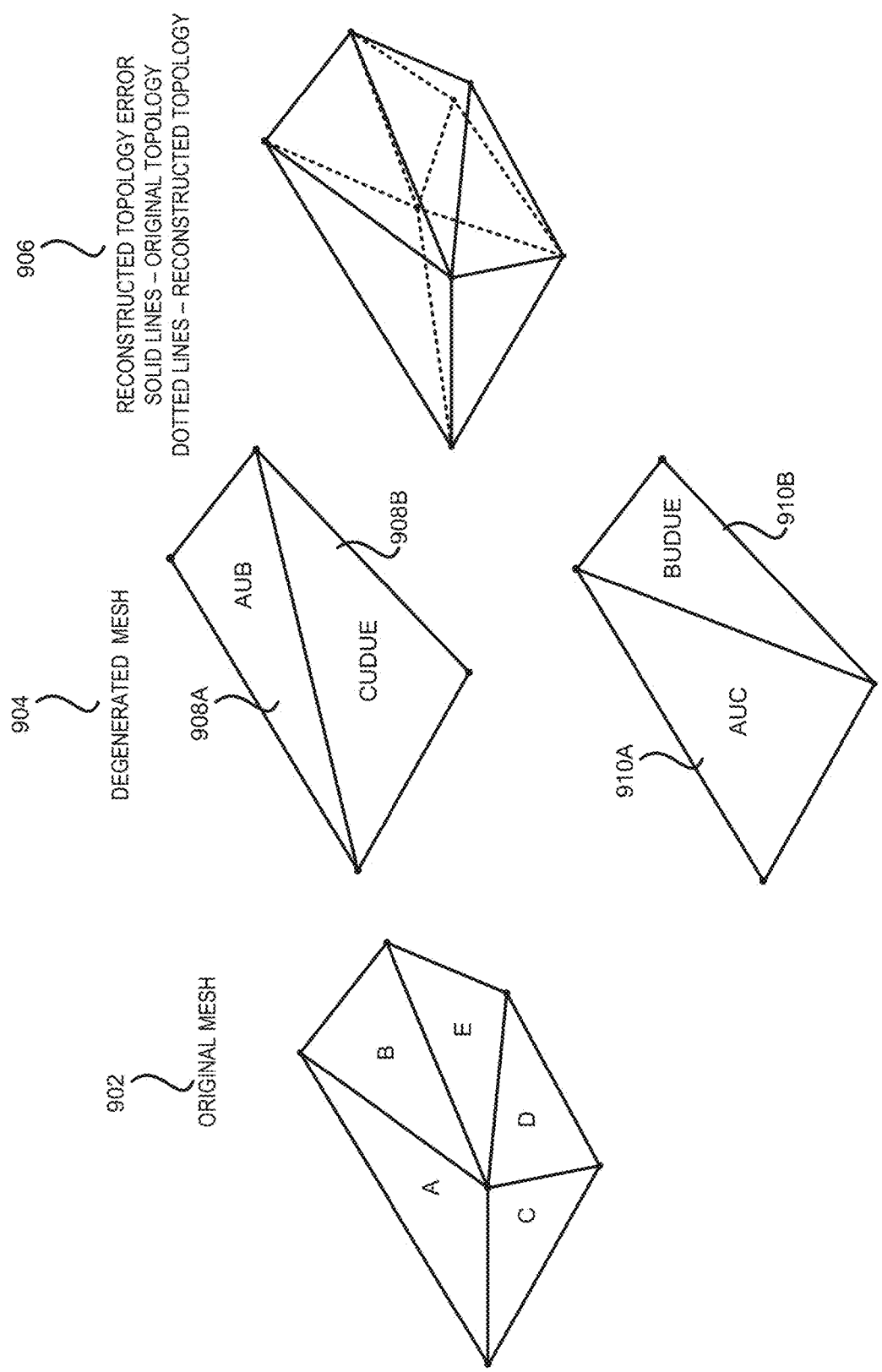
FIG. 9 shows an example of the degeneration of faces in a mesh caused by lossy encoding, according to various embodiments of the present disclosure.

For example, the geometry reconstruction module 802 can decode the encoded geometry component generated by the video coder 120b back to the geometry component images. In examples where the video coder 120b is a lossy encoder, due to prediction and quantization, the reconstructed geometry component images will be different from the geometry component images. As such, the reconstructed positions of the decoded vertexes of the mesh may differ from the original positions of the vertexes of the mesh. As a result, neighboring faces may degenerate into simplified geometry. FIG. 9 shows an example of the topology degeneration. In FIG. 9, the original mesh 902 includes five triangular faces: A, B, C, D, and E. After the reconstruction, the positions of the reconstructed vertices in the reconstructed mesh 904 are shifted compared to that of the vertices in the original mesh 902. In this example, the geometry primitive in the original mesh 902 degenerates to a planar or a nearly planar surface. This planar surface can be represented using two faces: faces 908A (approximately the union of faces A and B) and 908B (approximately the union of faces C, D, and E) or faces 910A (approximately the union of faces A and C) and 910B (approximately the union of faces B, D, and E). The reconstruction error 906 shows the position shifting of the vertices in the reconstructed mesh 904 compared to the original mesh 902.

Referring back to FIG. 8, based on the decoded/reconstructed geometry component images, the reconstructed geometry analysis module 804 can analyze the geometry information to determine vertices that can be removed from the connectivity component images thereby simplifying the connectivity component images. To determine a vertex to be removed, four vertices of a pair of neighboring faces or triangles of the mesh can be analyzed. In some examples, the two neighboring triangles have the same orientation. The reconstructed geometry analysis module 804 can form a triangle using three of the vertices with the fourth vertex inside the triangle. The distance from the fourth vertex to each of the three edges of the triangle can be determined. The smallest distance is determined among the three distances. If the smallest distance is below a pre-determined threshold, the vertex can be selected as a vertex to be removed. In some examples, the threshold may be adaptively defined by the encoder system 800 or passed as a user input to the encoder system 800. The generated triangle can be used as the triangle to be encoded. In other words, the pair of neighboring triangles can be merged into one triangle. This process can be repeated for other pairs of neighboring triangles.

The reconstructed geometry analysis module 804 provides the analysis results to the connectivity image simplification module 806 so that the connectivity component images can be simplified. The analysis results may include the vertices that are selected to be removed and, in some examples, the triangles to be merged. The connectivity image simplification module 806 can remove the selected vertices from the connectivity component images and update the connectivity component images to replace the data for the pairs of neighboring triangles with the corresponding merged triangles. The simplified connectivity component images may be provided to the video coder 120c for encoding as discussed above with respect to FIG. 1. The multiplexer 122 may then multiplex the encoded information to generate the coded mesh frame sequence 810 in a way similar to that described with respect to FIG. 1. Because of the connectivity simplification, the coded mesh frame sequence 810 is different from, and has a smaller size than, the coded mesh frame sequence 124 generated using the encoder system 100. While FIG. 8 shows three separate modules are involved in the connectivity simplification, i.e., the geometry reconstruction module 802, the reconstructed geometry analysis module 804, and the connectivity image simplification module 806, any number of modules may be employed to implement the connectivity simplification.

Figure 10:
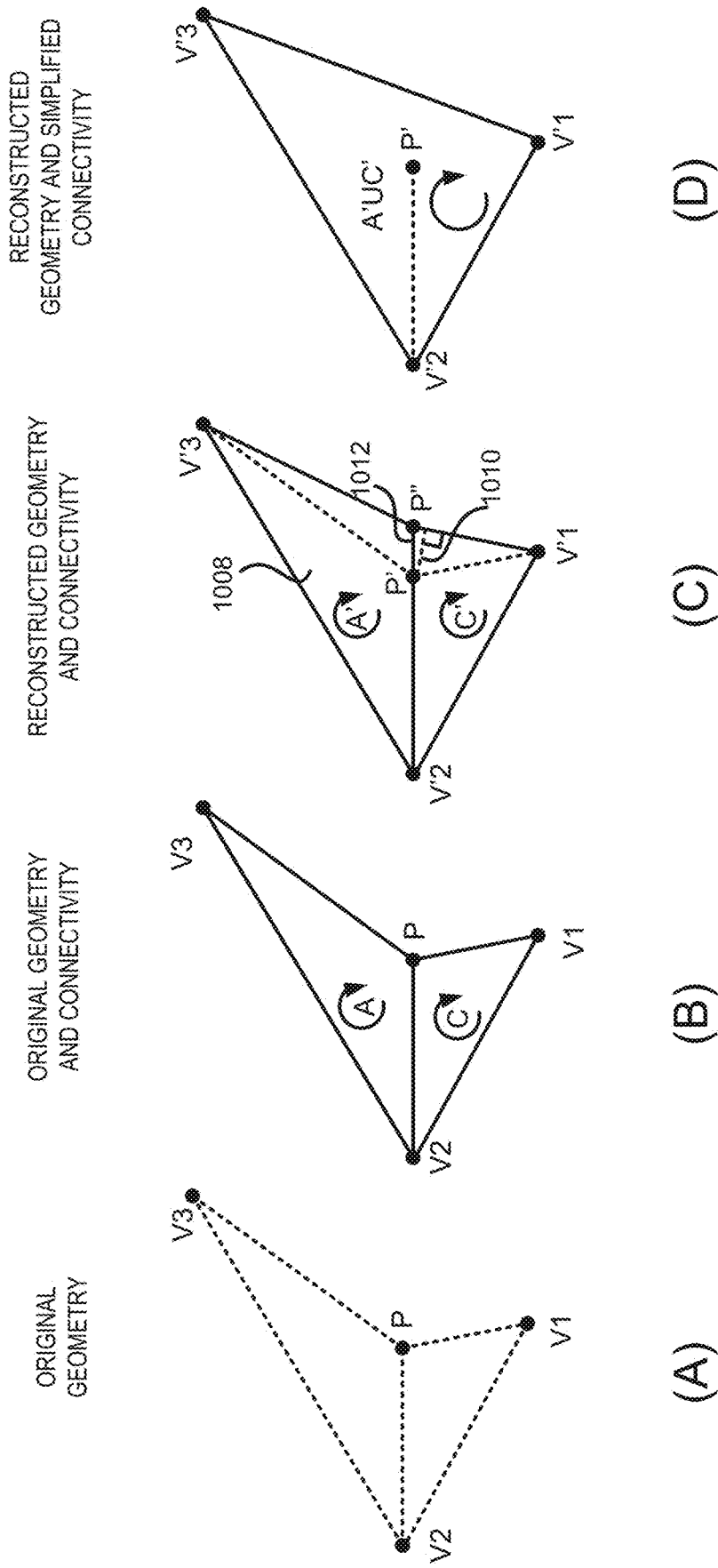
FIG. 10 provides an example of connectivity simplification, according to some embodiments of the present disclosure.

FIG. 10 provides an example of the connectivity simplification, according to some embodiments of the present disclosure. In this example, sub-figure (A) shows the original geometry information which specifies four vertices P, V1, V2, and V3. Sub-figure (B) shows the original geometry information along with the original connectivity information, which defines two neighboring triangles based on these four vertices: triangle P_V2_V3 and triangle P_V1_V2. These two triangles have the same counterclockwise orientation. Sub-figure (C) shows the reconstructed geometry and connectivity information. The reconstructed geometry information includes vertices P', V1', V2', and V3' which may have coordinates different from the respective original vertices due to lossy compression by the video coder. Among the four reconstructed vertices, V1', V2' and V3' can form a triangle 1008 with the fourth reconstructed vertex P' inside it.

The distance from P' to each of the three edges of the triangle 1008 is calculated. In some examples, the distance is measured as the length of a line from the vertex to the edge that is perpendicular to the edge. For example, the distance from P' to edge V1'V3' can be determined as the length of line 1010 that is perpendicular to edge V1'V3' and connects P'. Alternatively, or additionally, the distance can be defined as the length of the line which is generated by extending the line connecting the vertex opposite to the edge and P' until it intersects with the edge. In this example, the distance between P' to edge V1'V3' can be determined as the length of line 1012 (i.e., line P'P'') generated by extending the line V2'P' until it intersects with the edge V1' and V3' at point P''. The distance from P' to the other two edges V1'V2' and V2'V3' can be calculated in a similar way. The smallest distance among the three distances can be selected and compared with a pre-determined threshold to determine whether the point P' can be removed or excluded from encoding. If the smallest distance is smaller than the pre-determined threshold, then the faces associated with the point P' can be marked as to be removed or excluded from connectivity encoding. In such a case, the two triangles P_V2_V3 and P_V1_V2 can be merged into one triangle V1'V2'V3' which also preserves the counterclockwise orientation of the original two triangles. The faces associated with point P' that are inside the merged triangle are excluded from the connectivity component images. With this simplification, the reconstructed connectivity information only includes one triangle and the reconstructed geometry information includes the three vertices of the triangle and a vertex P' inside the triangle as shown in sub-figure (D). In some examples, only the triangles with the same orientation can be merged.

The coded mesh frame sequence 810 can be stored or transmitted and be decoded using the decoder system 200 as described above with respect to FIG. 2. In other words, the coded mesh frame sequence 810 with connectivity simplification can be decoded by a decoder system without taking into account that the connectivity information has been simplified.

In another embodiment, the decoder system can be configured to reconstruct the original connectivity information based on the simplified connectivity information. This can be performed by using the vertices decoded from the geometry information which is not simplified at the time of encoding. As such, the decoding process can include the demultiplexer of the decoder extracting corresponding components from the coded mesh bitstream including the geometry component bitstream, attribute component bitstream, connectivity component bitstream, and the mapping component bitstream. Each of the components of the coded mesh bitstream is then processed with a decoder for the corresponding component. For example, the attribute component can be decoded by a video decoder indicated in the mesh bitstream header. Similarly, the other components can also be decoded by the corresponding video decoder indicated in the mesh bitstream header. Based on the extracted components, a reconstruction process is applied to generate the reconstructed mesh frame.

In some examples, the decoding process include the following steps: obtaining a coded mesh bitstream from network or a storage source, demultiplexing components of the coded bitstream and decoding in parallel or otherwise independently, the geometry component bitstream, the attribute component bitstream, the connectivity component bitstream, and the mapping component bitstream. The decoding process further includes refining the decoded connectivity information to reconstruct or recover the original connectivity information that has been simplified by subdividing edges of faces or triangles that contain vertex inside thereof. The refined and decoded components can be used to reconstruct the mesh frames. By refining the decoded connectivity information, the distortions and visual artifacts in the decoded mesh frames that were introduced by the connectivity simplification can be reduced.

Figure 11:
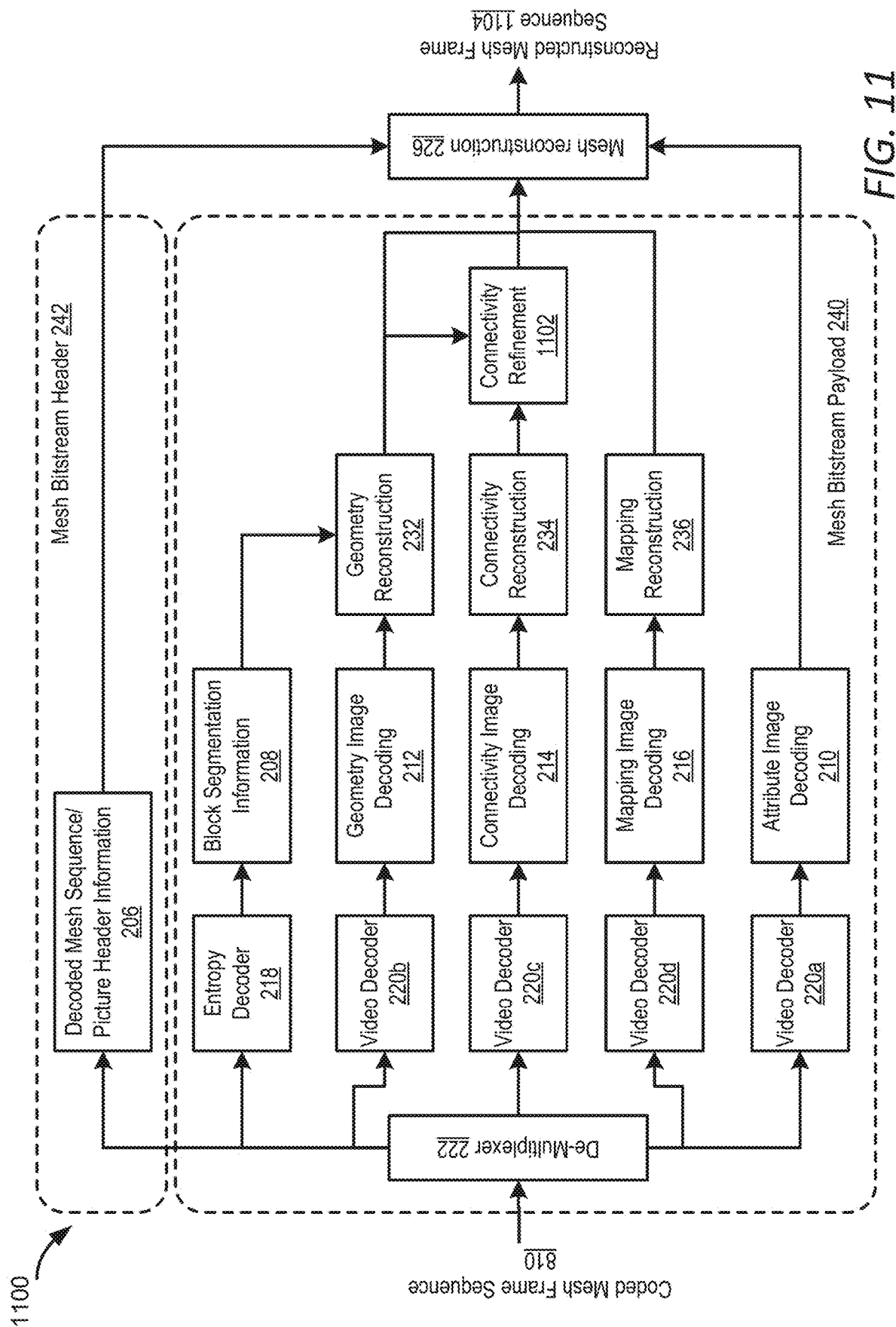
FIG. 11 illustrates an example decoder system for mesh decoding with connectivity refinement, according to various embodiments of the present disclosure.

FIG. 11 illustrates an example decoder system 1100 for mesh decoding with connectivity refinement, according to various embodiments of the present disclosure. The decoder system 1100 shown in FIG. 11 includes various components or modules that are similar to those in FIG. 2. In addition, the decoder system 1100 includes a connectivity refinement module 1102 to recover the connectivity information that was simplified at the encoder before the connectivity information is sent to the mesh reconstruction module 226 for reconstructing the mesh frame sequence 1104.

In some examples, the connectivity refinement module 1102 obtains the geometry information decoded by the geometry reconstruction module 232 from the geometry component bitstream. Vertex coordinates (X, Y, Z) are reconstructed using the decoded geometry and atlas components. The connectivity refinement module 1102 further obtains the connectivity information decoded from the connectivity component bitstream by the connectivity reconstruction module 234. The connectivity refinement module 1102 can mark the vertices from the geometry component that belong to the face list in the decoded connectivity information as visited, and mark the vertices that do not belong to the face list as non-visited.

For each non-visited vertex P', the connectivity refinement module 1102 finds a face or triangle $V'_1 \overparen{V'_2 V'_3}$ inside which P' is located, e.g., $P' \in V'_1 \overparen{V'_2 V'_3}$. The connectivity refinement module 1102 projects the vertex P' to the nearest edge (e.g., $\overline{V'_1 V'_3}$) of the triangle to find a projection vertex P'''. In some examples, the nearest edge is identified through the minimum Euclidean distance between the vertex and the edge. The projection vertex P''' is defined as an intersection of the ray casted from the opposite vertex $V'_2$ of the triangle $V'_1 \overparen{V'_2 V'} V'_3$ to the nearest edge $\overline{V'_1 V'_3}$ of the triangle $V'_1 \overparen{V'_2 V'} V'_3$. The connectivity refinement module 1102 subdivides the triangle $V'_1 V'_2 V'_3$ into two triangles both with the same orientation as the triangle $V'_1 \overparen{V'_2 V'} V'_3$. If there are more than one point inside the triangle $V'_1 \overparen{V'_2 V'} V'_3$, the connectivity refinement module 1102 can iterate this process recursively starting from the point that has the maximum Euclidian distance to the edge. Then the updated triangle is used for further subdivision. The refined connectivity information can be used to reconstruct the mesh frames along with other decoded components.

Figure 12:
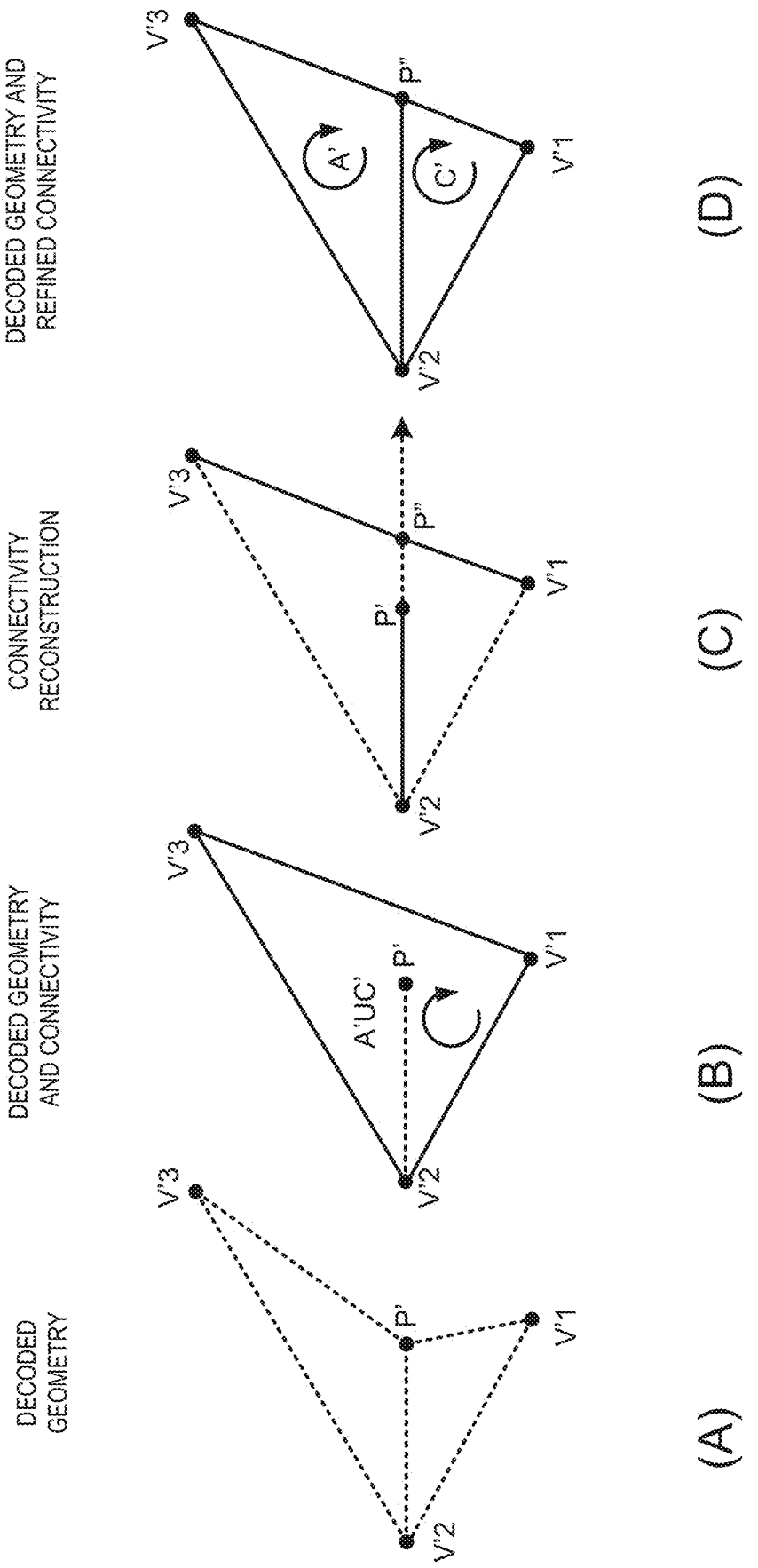
FIG. 12 shows an example of the connectivity refinement process, according to some embodiments of the present disclosure.

FIG. 12 shows an example of the decoder side connectivity refinement process, according to some embodiments of the present disclosure. In FIG. 12, the decoded geometry 1202 includes four points: P', $V'_1$, $V'_2$, and $V'_3$ as shown in sub-figure (A). Without connectivity simplification, the four points should form two faces: $P' \overparen{V'_1 V'_2}$ and $P' \overparen{V'_2 V'_3}$. Due to the simplification during encoding, these two faces have been merged as indicated by sub-figure (B) which shows the decoded geometry and connectivity information. In sub-figure (B), $V'_1$, $V'_2$, and $V'_3$ form a face/triangle with the point P' inside this face. Because the connectivity information has been simplified at the encoder, the isolated point P' inside the face indicates that the decoded triangle is a merged triangle from at least two triangles. To restore the triangles, the nearest edge for P' in triangle $V'_1 \overparen{V'_2 V'} V'_3$ is identified as $\overline{V'_1 V'_3}$ in this example. P' is projected to this nearest edge $\overline{V'_1 V'_3}$ to obtain the projection vertex P'''. The projection can be performed by extending the ray casted from the opposite vertex of the edge, $V'_2$, to find the intersection with the edge as shown in sub-figure (C) of FIG. 12. The triangle $V'_1 V'_2 V'_3$ is then divided into two triangles $V'_1 P''' V'_2$ and $P''' V'_2 V'_3$ each having the same orientation as triangle $V'_1 \overparen{V'_2 V'} V'_3$. As such, the decoded geometry and refined connectivity information shown in sub-figure (D) includes the two triangles instead of the merged triangle $V'_1 \overparen{V'_2 V'} V'_3$.

Figure 13:
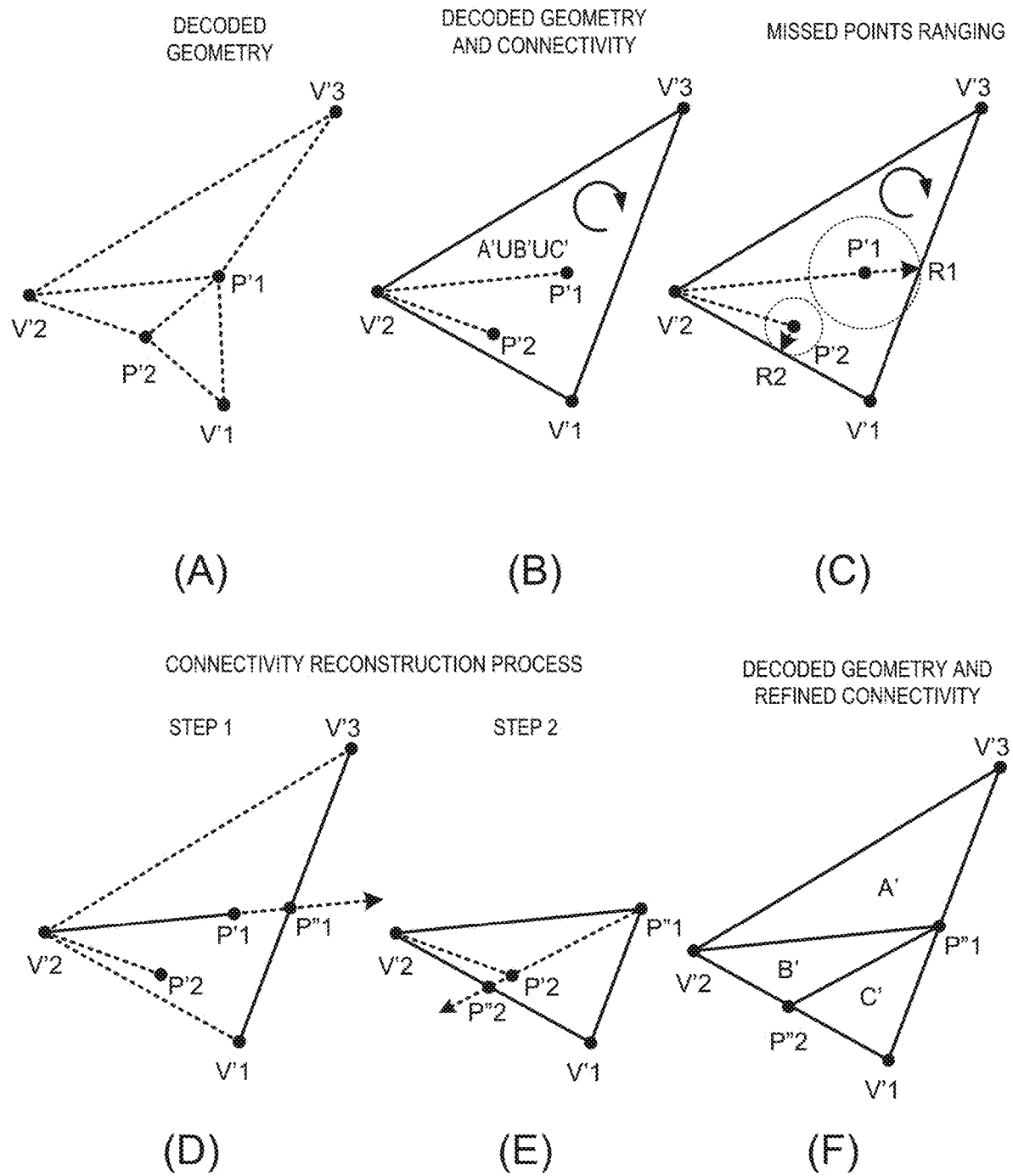
FIG. 13 shows another example of the connectivity refinement process, according to some embodiments of the present disclosure.

FIG. 13 shows another example of the connectivity refinement process, according to some embodiments of the present disclosure. In FIG. 13, there are more than one point inside the decoded triangle. As shown in sub-figure (A), the decoded geometry information includes five points: $V'_1$, $V'_2$, $V'_3$, $P'_1$ and $P'_2$. As shown in sub-figure (B), the decoded connectivity information indicates that one face is encoded as $V'_1 \overparen{V'_2 V'}_3$ with $P'_1$ and $P'_2$ inside this face. The nearest edge for $P'_1$ is identified as $\overline{V'_1 V'_3}$ and the nearest edge for $P'_2$ is identified as $\overline{V'_1 V'_2}$ as shown in sub-figure (C) of FIG. 13. Between $P'_1$ and $P'_2$, $P'_1$ has a larger distance to the nearest edge and thus the refinement is performed for $P'_1$ first. As shown in sub-figure (D), the projection vertex $P'''_1$ is found for $P'_1$ as the intersection of the ray $\overrightarrow{V'_2 P'_1}$ with the edge $\overline{V'_1 V'_3}$. The triangle $V'_1 \overparen{V'_2 V'}_3$ is thus divided into two triangles $P'''_1 \overparen{V'_2 V'}_3$ and $V'_1 \overparen{V'_2 P'''}_1$ each having the same counter-clockwise orientation as the triangle $V'_1 \overparen{V'_2 V'}_3$.

If any of the triangles contains a point inside it, such a triangle will be further divided. In this example, triangle $V'_1\overrightarrow{V'_2P''_1}$ has $P'_2$ inside it and thus will be further analyzed for division. As shown in sub-figure (E), the projection vertex $P'''_2$ is found for $P'_2$ as the intersection of the ray $\overrightarrow{P'''_1P'''_2}$ with $P'_2$'s nearest edge $\overline{V'_1V'_2}$. Triangle $V'_1\overrightarrow{V'_2P''_1}$ thus can be further divided into triangle $V'_1\overrightarrow{P''_2P''_1}$ and triangle $V'_2\overrightarrow{P''_2P''_1}$ both have the same orientation as the triangle $V'_1\overrightarrow{V'_2P''_1}$. Sub-figure (F) shows the reconstructed topology formed by the decoded geometry information with the refined connectivity information, where there are three reconstructed triangles, instead of the simplified one triangle before the refinement.

Figure 14:
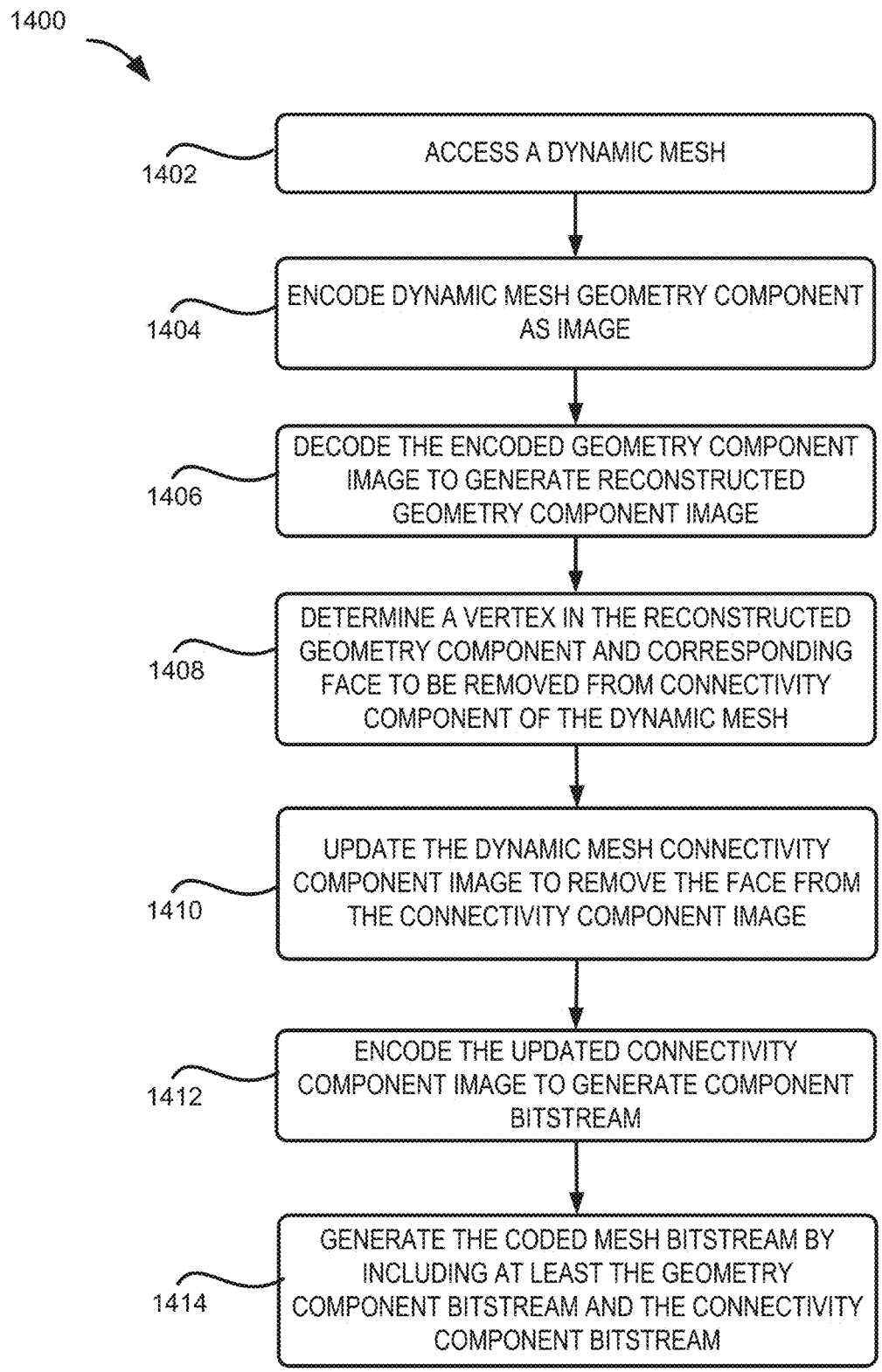
FIG. 14 depicts an example of a process for mesh coding with connectivity simplification, according to some embodiments of the present disclosure.

Referring now to FIG. 14, FIG. 14 depicts an example of a process 1400 for mesh coding with connectivity simplification, according to some embodiments of the present disclosure. One or more computing devices implement operations depicted in FIG. 1400 by executing suitable program code. For example, the encoder system 800 in FIG. 8 may implement the operations depicted in FIG. 1400 by executing the corresponding program code. For illustrative purposes, the process 1400 is described with reference to some examples depicted in the figures. Other implementations, however, are possible.

At block 1402, the process 1400 involves accessing a dynamic mesh to be encoded. As discussed above, the dynamic mesh may be represented as uncompressed mesh frame sequence that include mesh frames. A mesh frame is a data format that describes 3D content (e.g., 3D objects) in a digital representation as a collection of geometry, connectivity, attribute, and attribute mapping information. Each mesh frame is characterized by a presentation time and duration. A mesh frame sequence (e.g., sequence of mesh frames) forms a dynamic mesh video. The uncompressed mesh frame sequence can be segmented into segmented mesh data. Based on the segmented mesh data, the encoder system 800 can generate attribute component images, geometry component images, connectivity component images, and mapping component images.

At block 1404, the process 1400 involves encoding the geometry component images using a video encoder to generate a geometry component bitstream as described in detail with respect to FIGS. 1 and 8. At block 1406, the process 1400 involves decoding the encoded geometry component images to generate reconstructed geometry component images. The decoding is performed using a video decoder that corresponds to the video encoder used to the encode the geometry component images. As discussed above, in examples where the video encoder (e.g., video encoder 120b) is a lossy encoder, due to prediction and quantization, the reconstructed geometry component images will be different from the geometry component images. As such, the reconstructed position of the decoded vertexes of the mesh may differ from the original position of the vertexes of the mesh. As a result, neighboring faces may degenerate into simplified geometry.

At block 1408, the process 1400 involves determining a vertex in the reconstructed geometry component images that belongs to the face(s) to be removed from connectivity component images of the dynamic mesh. To determine the face to be removed, four vertices of a pair of neighboring faces or triangles of the mesh can be analyzed. In some examples, the two neighboring triangles have the same orientation. A triangle can be formed using three of the vertices with the fourth vertex inside the triangle. The distance from the fourth vertex to each of the three edges of the triangle can be determined. The smallest distance is determined among the three distances. If the smallest distance is below a pre-determined threshold, these two neighboring faces can be selected as faces to be removed and replaced with a single face. The generated triangle can be used as the triangle to be encoded in place of the two neighboring triangles (i.e., the two neighboring triangles are merged into the generated triangle). This step can be repeated to identify multiple vertices to be removed and multiple pairs of neighboring triangles to be merged.

At block 1410, the process 1400 involves updating the connectivity component images of the dynamic mesh to simplify the connectivity information. For example, the simplification can include removing the faces identified in block 1408 from the connectivity component images and updating the connectivity component images to replace the data for the pairs of neighboring triangles with the corresponding merged triangles. At block 1412, the process 1400 involves encoding the updated connectivity component images to generate a connectivity component bitstream. As discussed above in detail with respect to FIGS. 1 and 8, the encoding may involve using a video encoder to generate the connectivity component bitstream. At block 1414, the process 1400 involves generating a coded mesh bitstream by including at least the geometry component bitstream and the connectivity component bitstream. For example, the coded mesh bitstream can be generated by multiplexing the mesh bitstream payload, that includes the geometry component bitstream and the connectivity component bitstream as well as other bitstream such as attribute component bitstream, mapping component bitstream, and so on, with a mesh bitstream header.

Figure 15:
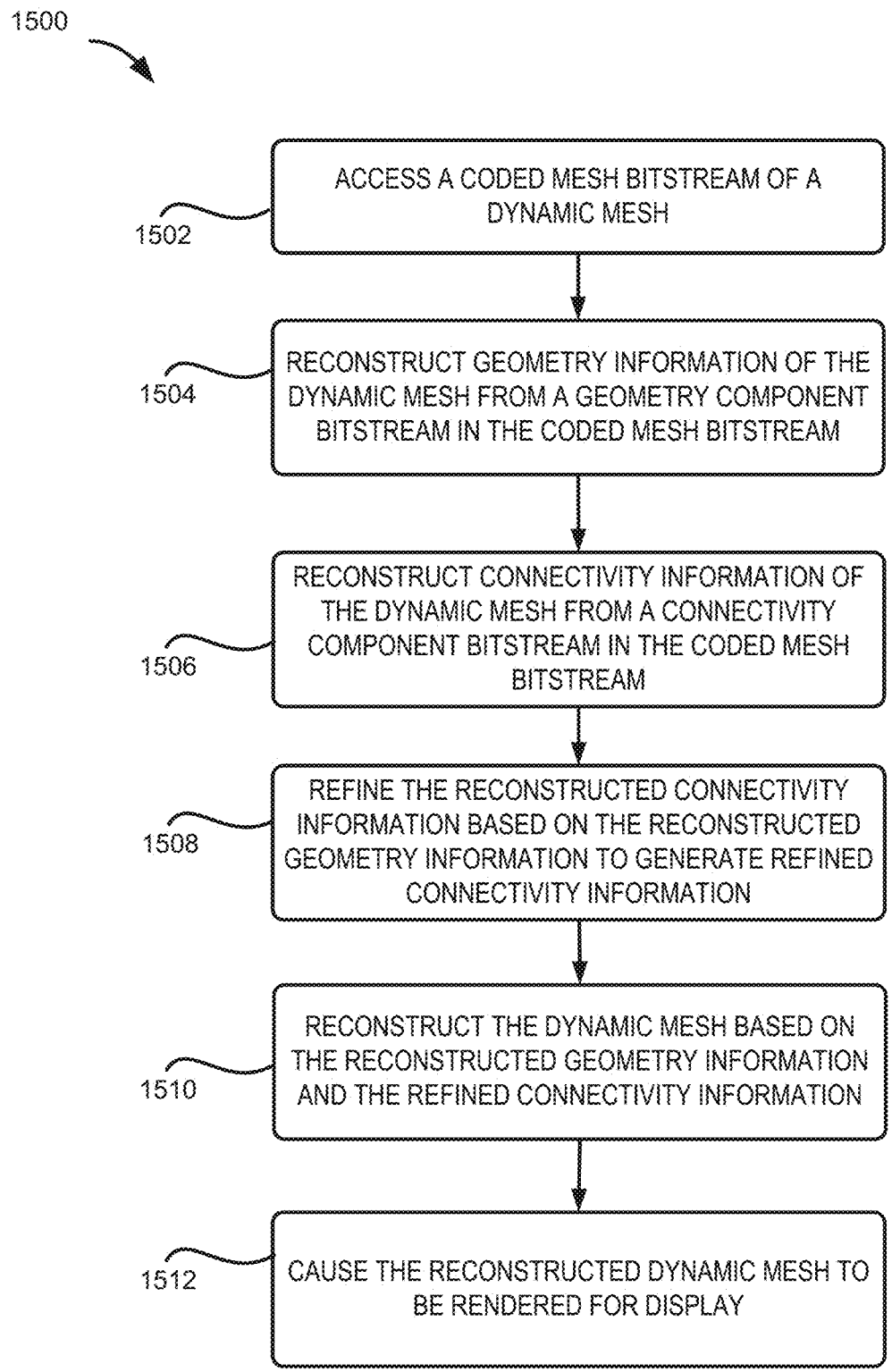
FIG. 15 depicts an example of a process for decoding a coded mesh bitstream with connectivity refinement, according to some embodiments of the present disclosure.

Referring now to FIG. 15, FIG. 15 depicts an example of a process 1500 for decoding a coded mesh bitstream with connectivity refinement, according to some embodiments of the present disclosure. One or more computing devices implement operations depicted in FIG. 1500 by executing suitable program code. For example, the decoder system 1100 in FIG. 11 may implement the operations depicted in FIG. 1100 by executing the corresponding program code. For illustrative purposes, the process 1500 is described with reference to some examples depicted in the figures. Other implementations, however, are possible.

At block 1502, the process 1500 involves accessing a coded mesh bitstream of a dynamic mesh for decoding. The coded mesh bitstream is encoded with connectivity simplification described above. The coded mesh bitstream can include a geometry component bitstream, an attribute component bitstream, a connectivity component bitstream, and a mapping component bitstream.

At block 1504, the process 1500 involves reconstructing geometry information of the dynamic mesh from the geometry component bitstream in the coded mesh bitstream. The reconstructed geometry information includes data specifying vertices of the dynamic mesh. As discussed above in detail with respect to FIGS. 2 and 11, the geometry information of the dynamic mesh can be reconstructed from the geometry component bitstream by applying a video decoder to the geometry component bitstream to generate reconstructed geometry component images which is then used to reconstruct the ordered list of vertex coordinates in the geometry information.

At block 1506, the process 1500 involves reconstructing connectivity information of the dynamic mesh from the connectivity component bitstream in the coded mesh bitstream. The reconstructed connectivity information includes data specifying the faces (e.g., triangles) of the dynamic mesh. Similar to the geometry information, the connectivity information of the dynamic mesh can be reconstructed from the connectivity component bitstream by applying a video decoder to the connectivity component bitstream to generate reconstructed connectivity component images. The generated reconstructed connectivity component images are then used to reconstruct the ordered list of face information with the corresponding vertex index and, in some cases, the texture index. Other components of the coded mesh bitstream, such as the attribute component bitstream, mapping component bitstream, can also be decoded and used to reconstruct the corresponding information.

At block 1508, the process 1500 involves refining the reconstructed connectivity information based on the reconstructed geometry information to generate refined connectivity information. As discussed above in detail, the refinement process divides a face specified by the reconstructed connectivity information into two faces based on a vertex specified in the reconstructed geometry information but not listed as a vertex of any faces specified by the reconstructed connectivity information. For example, a vertex that is located inside a face of the reconstructed connectivity information can be identified and its projected vertex on an edge of the face can be determined. The face can then be divided into two refined faces, each refined face having the projected vertex as one vertex and having the same orientation as the initially reconstructed face.

At block 1510, the process 1500 involves reconstructing the dynamic mesh based on the reconstructed geometry information and the refined connectivity information as well as other information including the attribute information, the mapping information, and so on. At block 1512, the process 1500 involves causing the reconstructed dynamic mesh to be rendered for display. For example, the reconstructed dynamic mesh can be transmitted to a device or a module configured to render the 3D object represented by the reconstructed dynamic mesh to generate rendered images or video for display.

Figure 16:
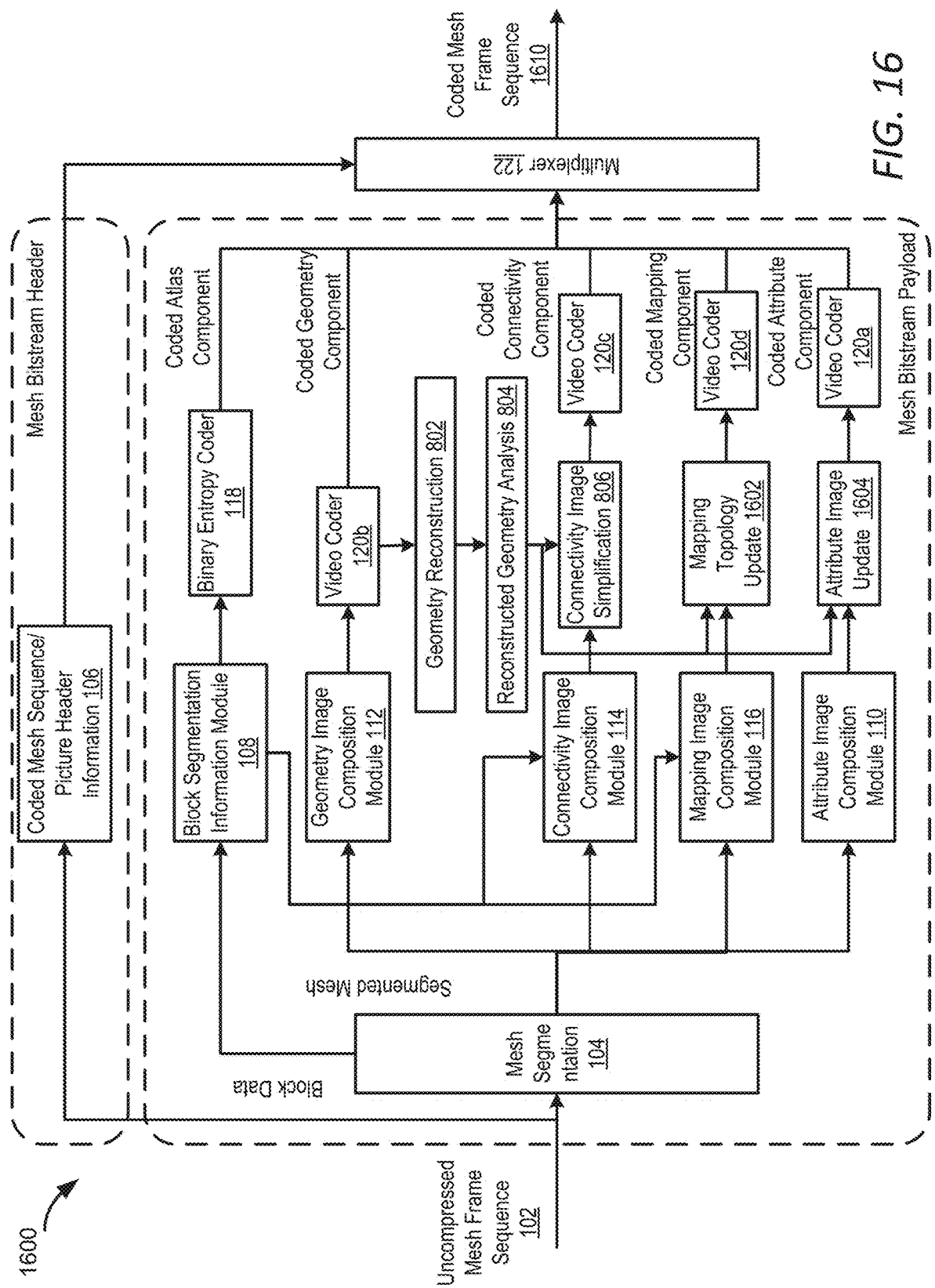
FIG. 16 illustrates an example of an encoder system for mesh coding with connectivity simplification and attribute and mapping adjustment, according to various embodiments of the present disclosure.

FIG. 16 illustrates an example of an encoder system 1600 for mesh coding with connectivity simplification and attribute and mapping adjustment, according to various embodiments of the present disclosure. The encoder system 1600 shown in FIG. 16 includes various components or modules that are similar to those in FIG. 8. In addition, the encoder system 1600 includes a mapping topology update module 1602 and an attribute image update module 1604 to update the mapping topology and the attribute images, respectively, in addition to the connectivity simplification to reduce the distortion caused by the reconstruction errors of the geometry information. As shown in FIG. 10, because of the lossy compression of the geometry information, the reconstructed vertices may have different coordinates than the original coordinates. In this example, a vertex P becomes P' after the encoding and reconstruction. To reduce the visual artifacts caused by this reconstruction error, the attribute information and the mapping information should be adjusted accordingly. For example, the attribute image update module 1604 can update the attribute component images to reflect the distortion caused by geometry encoding and reconstruction. To do so, the attribute image update module 1604 can employ an attribute reprojection process.

The distortions associated with an attribute image that was introduced by geometry compression error can be described as a transformation such as an affine transformation. The transformation is applied to a point that belongs to the edge between the two neighboring triangles that are degenerated and merged during the connectivity simplification, such as point P in FIG. 10. As such, the reprojection process can be implemented as the same transformation applied to corresponding attribute samples of each degenerated triangular face in the attribute image. The boundaries of the triangular face are defined by the vertex mapping coordinates (U, V) and the connectivity information (f_idx_1, f_idx_2, f_idx_3) as shown in FIG. 5. The transformation T( ) can be represented using a 4×4 matrix M, where $$M = \begin{pmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{pmatrix}. \tag{1}$$

The transformation T( ) can be an affine transformation, The affine transformation T( ) transforms point (or vector) p to point (or vector) p'. The transformation T( ) of point p to point p' is obtained by performing the matrix-vector multiplication Mp:

$$p' = Mp \tag{2}$$

$$\begin{pmatrix} x' \\ y' \\ z' \\ 1 \end{pmatrix} = M \begin{pmatrix} x \\ y \\ z \\ 1 \end{pmatrix} \tag{3}$$

One example of matrix M to implement shear transformation T( ) is $$\begin{bmatrix} x' \\ y' \\ z' \\ 1 \end{bmatrix} = \begin{bmatrix} 1 & S_h & 0 & 0 \\ 0 & 1 & 0 & 0 \\ 0 & 0 & 1 & 0 \\ 0 & 0 & 0 & 1 \end{bmatrix} \begin{bmatrix} x \\ y \\ z \\ 1 \end{bmatrix}. \tag{4}$$

For example, the shear transform parameters $S_h$ can be derived from the vectors representing the points P' and P shown in FIG. 10.

Another example of matrix M to implement rotation transformation T( ) is $$\text{For Axis } X: \begin{bmatrix} x' \\ y' \\ z' \\ 1 \end{bmatrix} = \begin{bmatrix} 1 & 0 & 0 & 0 \\ 0 & \cos(\theta) & -\sin(\theta) & 0 \\ 0 & \sin(\theta) & \cos(\theta) & 0 \\ 0 & 0 & 0 & 1 \end{bmatrix} \begin{bmatrix} x \\ y \\ z \\ 1 \end{bmatrix}. \tag{5}$$

$$\text{For Axis } Y: \begin{bmatrix} x' \\ y' \\ z' \\ 1 \end{bmatrix} = \begin{bmatrix} \cos(\theta) & 0 & -\sin(\theta) & 0 \\ 0 & 1 & 0 & 0 \\ \sin(\theta) & 0 & \cos(\theta) & 0 \\ 0 & 0 & 0 & 1 \end{bmatrix} \begin{bmatrix} x \\ y \\ z \\ 1 \end{bmatrix}.$$

$$\text{For Axis } Z: \begin{bmatrix} x' \\ y' \\ z' \\ 1 \end{bmatrix} = \begin{bmatrix} \cos(\theta) & -\sin(\theta) & 0 & 0 \\ \sin(\theta) & \cos(\theta) & 0 & 0 \\ 0 & 0 & 1 & 0 \\ 0 & 0 & 0 & 1 \end{bmatrix} \begin{bmatrix} x \\ y \\ z \\ 1 \end{bmatrix}.$$

FIG. 17 shows examples of the affine transformations. Sub-figure (A) shows an example of the shear transformation for the 2-dimensional case and sub-figure (B) shows an example of the rotation transformation for the 2-dimensional case. The attribute image update module 1604 can select the format of the affine transformation (e.g., the shear transformation, the rotation transformation, or another transformation) and determine the parameters of the transformation based on the distortions associated with the lossy compression applied to geometry component and connect connectivity simplification.

Alternatively, or additionally, an interpolation transformation filter, such as a bilinear interpolation transformation filter, a Lanczos interpolation transformation filter, can be used to reproject the face of the attribute image corresponding to the degenerated face on the simplified topology. The parameters of the filter, such as the coefficients, positions, and length of the filter can be signaled in the coded mesh bitstream or be an integral part of the encoder, such as look-up table. For examples, the parameters can be signaled using supplemental enhancement information message or by indicating a filter index in a look-up table. The updated attribute component image can be provided to the video coder 120*a* for encoding as discussed above with respect to FIG. 1.

Similarly, the mapping topology update module 1602 can update the mapping component images in accordance with the connectivity simplification. The mapping topology update module 1602 can use the analysis results generated by the reconstructed geometry analysis module 804 which can include the vertices that are selected to be removed and, in some examples, the triangles to be merged. The mapping component coordinates (U, V) can be updated according to the changes of an attribute component image. The mapping coordinate associated with the vertex P in the original attribute image is updated with transformed mapping coordinates associated with vertex P'.

The updated mapping component images may be provided to the video coder 120*d* for encoding as discussed above with respect to FIG. 1. The multiplexer 122 may then multiplex the encoded information to generate the coded mesh frame sequence 1610 in a way similar to that described with respect to FIG. 1. Because of the attribute update and mapping update in addition to the connectivity simplification, the coded mesh frame sequence 1610 is different from the coded mesh frame sequence 124 generated using the encoder system 100 and the coded mesh frame sequence 810 generated using the encoder system 800.

Figure 18:
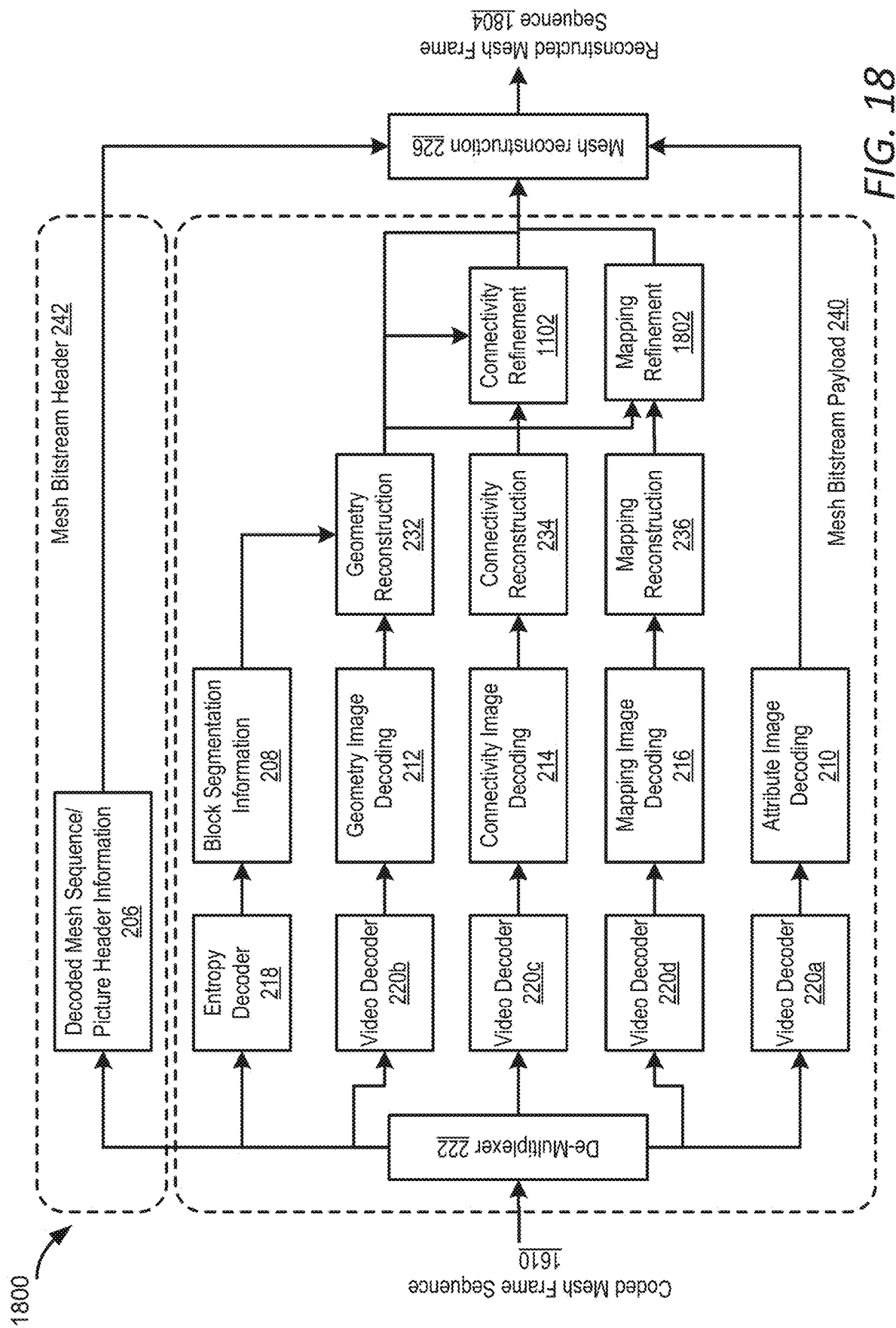
FIG. 18 illustrates an example decoder system for mesh decoding with connectivity refinement and mapping refinement, according to various embodiments of the present disclosure.

FIG. 18 illustrates an example decoder system 1800 for mesh decoding with connectivity refinement and mapping refinement, according to various embodiments of the present disclosure. The decoder system 1800 shown in FIG. 18 includes various components or modules that are similar to those in FIG. 11. In addition, the decoder system 1800 includes a mapping refinement module 1802 to recover the mapping information that was updated at the encoder before the mapping information is sent to the mesh reconstruction module 226 for reconstructing the mesh frame sequence 1804.

In some examples, the mapping refinement module 1802 can adjust the position of the vertex P' in the attribute component image according to the equation (1). For example, the mapping refinement module 1802 can estimate the transformation defined in equation (1) with P being the reconstructed point position and P' being the projected point position. Based on the estimated transformation, the transform defined in equation (6) is applied to U and V coordinates of the reconstructed mapping component images. The refined mapping information can be used to reconstruct the mesh frames along with other decoded components.

$$M = \begin{pmatrix} a_{11} & a_{12} & 0 & 0 \\ a_{21} & a_{22} & 0 & 0 \\ 0 & 0 & 1 & 0 \\ 0 & 0 & 0 & 1 \end{pmatrix}. \quad (6)$$

Figure 19:
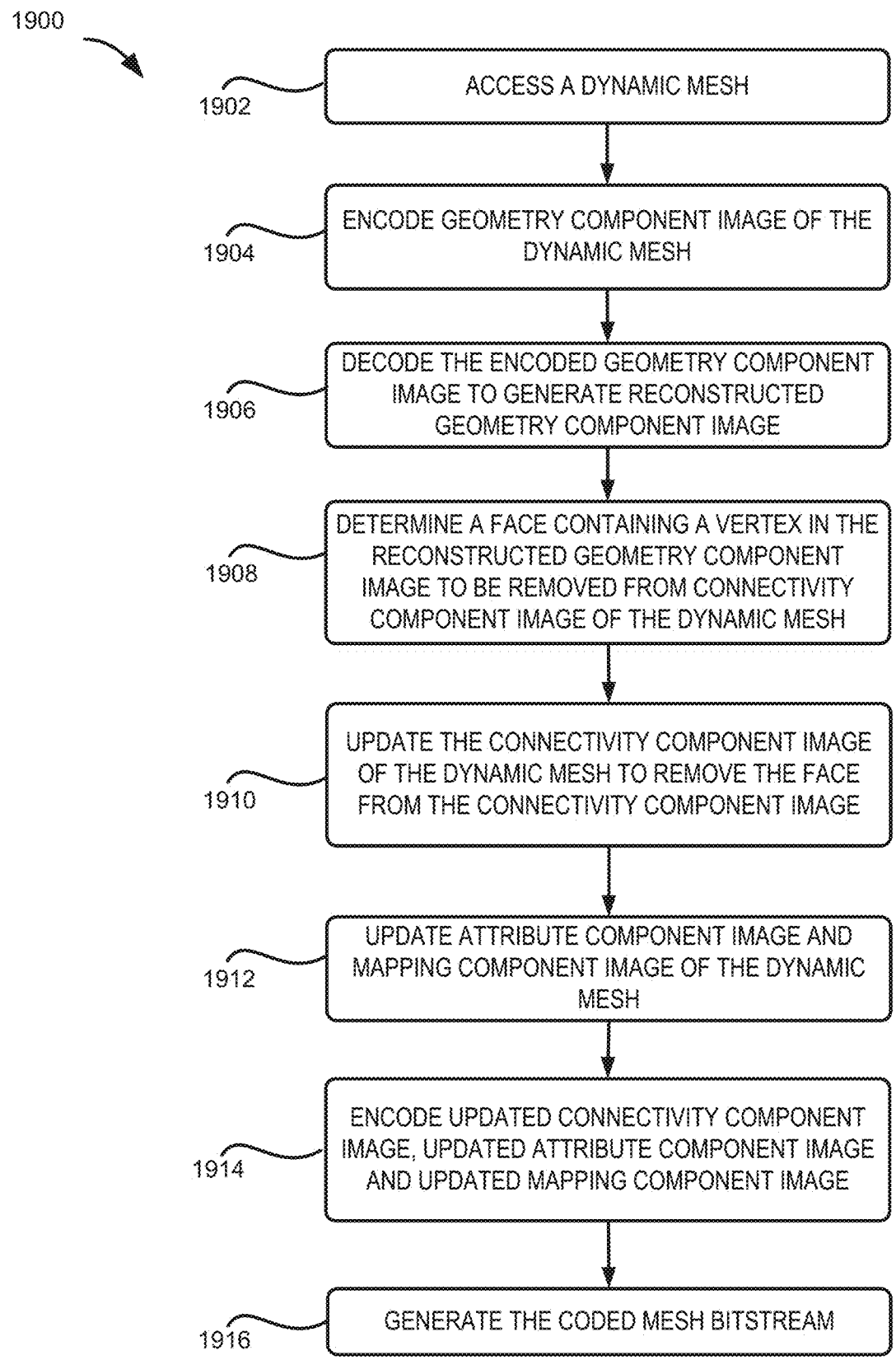
FIG. 19 depicts an example of a process for mesh coding with connectivity simplification and attribute and mapping adjustment, according to some embodiments of the present disclosure.

Referring now to FIG. 19, FIG. 19 depicts an example of a process 1900 for mesh coding with connectivity simplification and attribute and mapping adjustment, according to some embodiments of the present disclosure. One or more computing devices implement operations depicted in FIG. 1900 by executing suitable program code. For example, the encoder system 1600 in FIG. 16 may implement the operations depicted in FIG. 1900 by executing the corresponding program code. For illustrative purposes, the process 1900 is described with reference to some examples depicted in the figures. Other implementations, however, are possible.

At block 1902, the process 1900 involves accessing a dynamic mesh to be encoded. As discussed above, the dynamic mesh may be represented as uncompressed mesh frame sequence that include mesh frames. A mesh frame is a data format that describes 3D content (e.g., 3D objects) in a digital representation as a collection of geometry, connectivity, attribute, and attribute mapping information. Each mesh frame is characterized by a presentation time and duration. A mesh frame sequence (e.g., sequence of mesh frames) forms a dynamic mesh video. The uncompressed mesh frame sequence can be segmented into segmented mesh data. Based on the segmented mesh data, the encoder system 1600 can generate attribute component images, geometry component images, connectivity component images, and mapping component images.

At block 1904, the process 1900 involves encoding the geometry component images using a video encoder to generate a geometry component bitstream as described in detail with respect to FIG. 1. At block 1906, the process 1900 involves decoding the encoded geometry component images to generate reconstructed geometry component images. The decoding is performed using a video decoder that corresponds to the video encoder used to the encode the geometry component images. As discussed above, in examples where the video encoder (e.g., video encoder 120*b*) is a lossy encoder, due to prediction and quantization, the reconstructed geometry component images will be different from the geometry component images. As such, the reconstructed position of the decoded vertexes of the mesh may differ from the original position of the vertexes of the mesh. As a result, neighboring faces may degenerate into simplified topology.

At block 1908, the process 1900 involves determining a face containing a vertex in the reconstructed geometry component images to be removed from connectivity component images of the dynamic mesh. At block 1910, the process 1900 involves updating the connectivity component images of the dynamic mesh to simplify the connectivity information. Blocks 1908 and 1910 are similar to block 1408 and block 1410, respectively, described with regard to FIG. 14.

At block 1912, the process 1900 involves updating the attribute component images and the mapping component images of the dynamic mesh. As discussed above in detail with respect to FIG. 16, the encoder system 1600 can estimate the transformation applied to the vertices in the degenerated geometry information by the lossy compression and apply the same transformation to the corresponding faces in the attribute images. The mapping component coordinates (U, V) can be updated according to the changes of an attribute component image. The mapping coordinate associated with the vertex P in the original attribute image is updated with transformed mapping coordinates associated with vertex P'.

At block 1914, the process 1900 involves encoding the updated connectivity component images to generate a connectivity component bitstream, encoding the updated attribute component images to generate an attribute component bitstream, and encoding the updated mapping component images to generate a mapping component bitstream. As discussed above in detail with respect to FIG. 1, the encoding may involve using video encoders to generate the respective component bitstreams. At block 1916, the process 1900 involves generating a coded mesh bitstream by including at least the geometry component bitstream, the connectivity component bitstream, the attribute component bitstream, and the mapping component bitstream. For example, the coded mesh bitstream can be generated by multiplexing the mesh bitstream payload, that includes the encoded component bitstreams with a mesh bitstream header.

Figure 20:
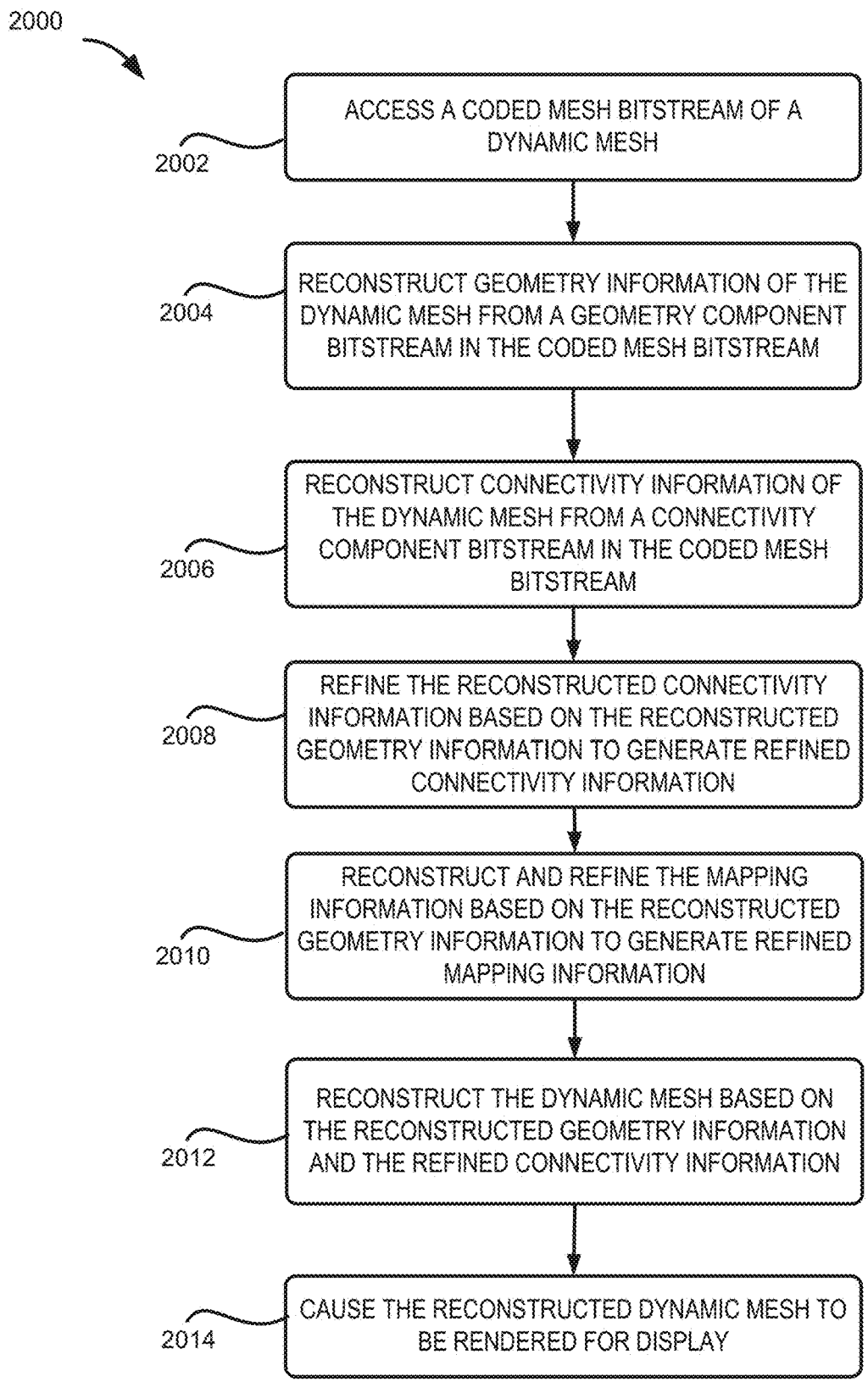
FIG. 20 depicts an example of a process for decoding a coded mesh bitstream with connectivity refinement and mapping refinement, according to some embodiments of the present disclosure.

Referring now to FIG. 20, FIG. 20 depicts an example of a process 2000 for decoding a coded mesh bitstream with connectivity refinement and mapping refinement, according to some embodiments of the present disclosure. One or more computing devices implement operations depicted in FIG. 2000 by executing suitable program code. For example, the decoder system 1800 in FIG. 18 may implement the operations depicted in FIG. 2000 by executing the corresponding program code. For illustrative purposes, the process 2000 is described with reference to some examples depicted in the figures. Other implementations, however, are possible.

At block 2002, the process 2000 involves accessing a coded mesh bitstream of a dynamic mesh for decoding. The coded mesh bitstream is encoded with connectivity simplification and attribute and mapping updates described above with respect to FIG. 19. The coded mesh bitstream can include a geometry component bitstream, an attribute component bitstream, a connectivity component bitstream, and a mapping component bitstream.

At block 2004, the process 2000 involves reconstructing geometry information of the dynamic mesh from the geometry component bitstream in the coded mesh bitstream. The reconstructed geometry information includes data specifying vertices of the dynamic mesh. As discussed above in detail with respect to FIG. 2, the geometry information of the dynamic mesh can be reconstructed from the geometry component bitstream by applying a video decoder to the geometry component bitstream to generate reconstructed geometry component images which is then used to reconstruct the ordered list of vertex coordinates in the geometry information.

At block 2006, the process 2000 involves reconstructing connectivity information of the dynamic mesh from the connectivity component bitstream in the coded mesh bitstream. At block 2008, the process 2000 involves refining the reconstructed connectivity information based on the reconstructed geometry information to generate refined connectivity information. Blocks 2006 and 2008 are similar to block 1506 and block 1508, respectively, described with regard to FIG. 15.

At block 2010, the process 2000 involves reconstructing the mapping information from the mapping component bitstream and refining the reconstructed mapping information. As discussed above in detail with respect to FIG. 2, the mapping information of the dynamic mesh can be reconstructed from the mapping component bitstream by applying a video decoder to the mapping component bitstream to generate reconstructed mapping component images which are then used to reconstruct the ordered list of projected vertex attribute coordinate information. The reconstructed mapping information can be refined by the mapping refinement module 1802 via adjusting the position of the vertex P' in the attribute component images according to equation (1). For example, the mapping refinement module 1802 can update the mapping component images to reflect the distortions caused by the topology simplification. The mapping refinement module 1802 can estimate the transformation defined in equation (1) with P being the reconstructed point position and P' being the projected point position. Based on the estimated transformation, the transform defined in equation (6) is applied to U and V coordinates of the reconstructed mapping image component.

At block 2012, the process 2000 involves reconstructing the dynamic mesh based on the reconstructed geometry information, the refined connectivity information, and the refined mapping information as well as other information including the decoded attribute information and so on. At block 2014, the process 2000 involves causing the reconstructed dynamic mesh to be rendered for display. For example, the reconstructed dynamic mesh can be transmitted to a device or a module configured to render the 3D object represented by the reconstructed dynamic mesh to generate rendered images or video for display.

Figure 21:
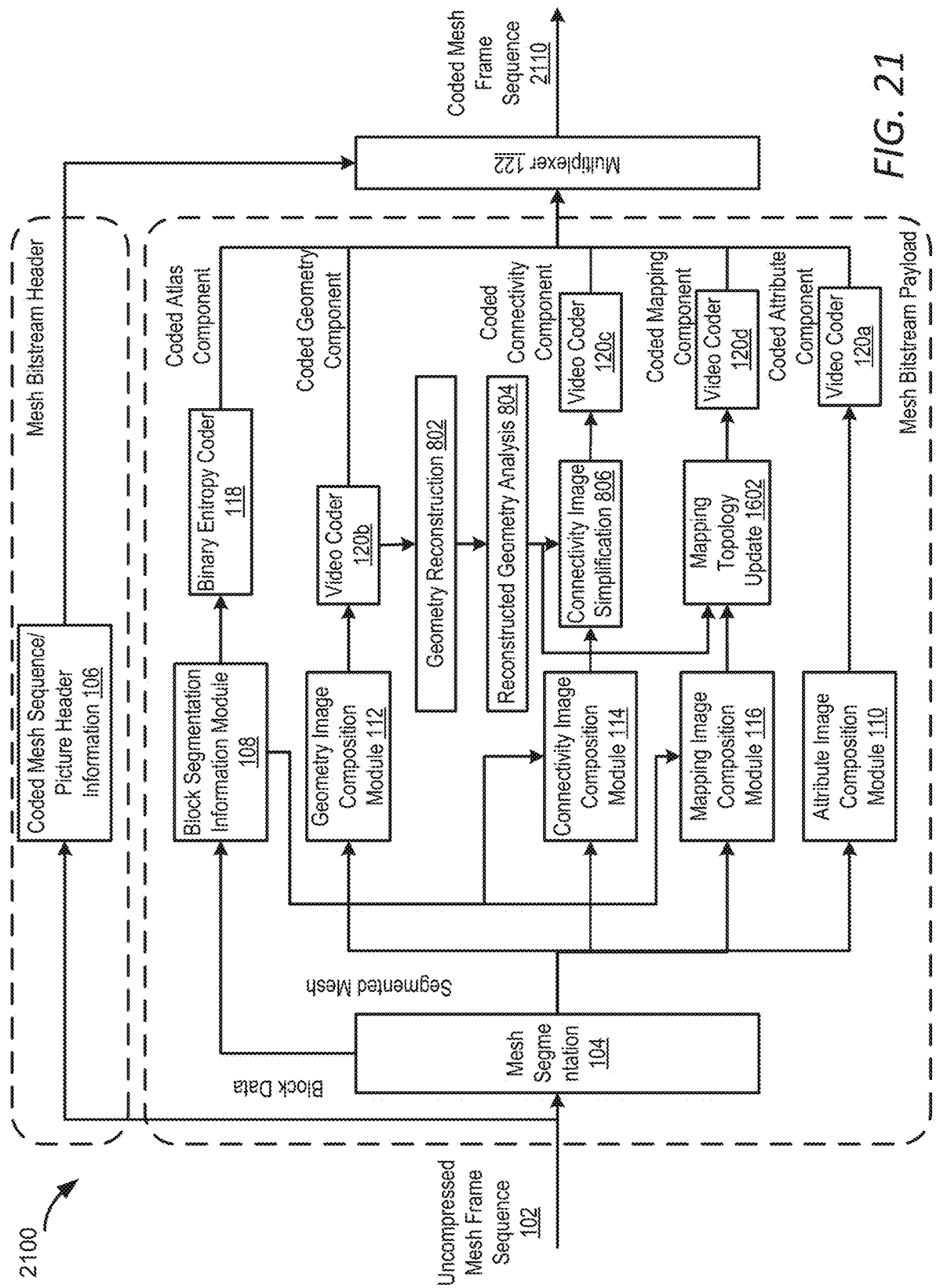
FIG. 21 illustrates an example of an encoder system for mesh coding with connectivity simplification and attribute and mapping adjustment, according to various embodiments of the present disclosure.

FIG. 21 illustrates an example of an encoder system 2100 for mesh coding with connectivity simplification and attribute and mapping adjustment, according to various embodiments of the present disclosure. The encoder system 2100 shown in FIG. 21 includes various components or modules that are similar to those in FIG. 16. Compared with FIG. 16, the encoder system 2100 does not include the attribute image update module 1604 for updating the attribute images. In other words, the attribute component images are encoded by the video encoder 120a. The multiplexer 122 can multiplex the encoded information to generate the coded mesh frame sequence 2110 in a way similar to that described with respect to FIG. 1. Because of the attribute update is not performed at the encoder along with the connectivity simplification and mapping update, the coded mesh frame sequence 2110 is different from the coded mesh frame sequence 124 generated using the encoder system 100, the coded mesh frame sequence 810 generated using the encoder system 800, and the coded mesh frame sequence 1610 generated using the encoder system 1600. Not updating the attribute image at the encoder side allows the encoder system 2100 to generate the coded mesh frame sequence 2110 faster than the encoder system 1600 shown in FIG. 16.

Figure 22:
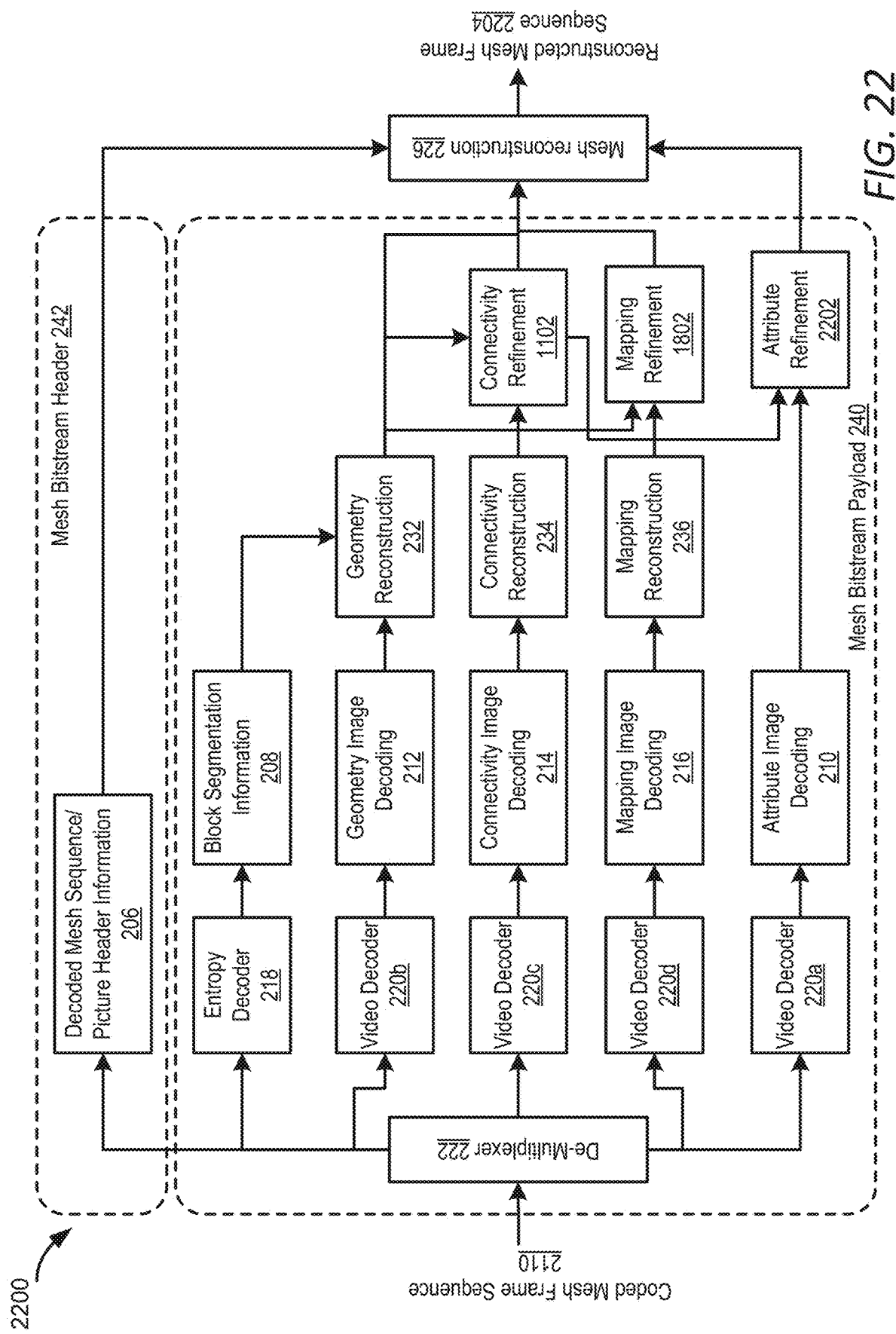
FIG. 22 illustrates an example decoder system for mesh decoding with connectivity refinement, mapping refinement, and attribute refinement, according to various embodiments of the present disclosure.

FIG. 22 illustrates an example decoder system 2200 for mesh decoding with connectivity refinement, mapping refinement, and attribute refinement, according to various embodiments of the present disclosure. The decoder system 2200 shown in FIG. 22 includes various components or modules that are similar to those in FIG. 18. In addition, the decoder system 2200 includes an attribute refinement module 2202 to refine and transform the decoded attribute image according to the distortions occurred to the geometry information before the attribute image is sent to the mesh reconstruction module 226 for reconstructing the mesh frame sequence 2204.

In some examples, the attribute refinement module 2202 estimates the transformation applied to each degenerated triangular face in a way similar to the estimation of the transformation performed by the attribute image update module 1604. For example, the attribute refinement module 2202 can estimate the affine transformation T( ) according Eqns. (1)-(5) with P being the original reconstructed point position and P' being the projected point position. An inverse of the estimated affine transformation can be applied to the decoded attribute image. For example, if the estimated transformation is a shear transform with the shear transform parameters $S_h$, the inverse shear transform can be applied to the decoded attribute image according to the following:

$$\begin{bmatrix} x'' \\ y'' \\ z'' \\ 1 \end{bmatrix} = \begin{bmatrix} 1 & 1/S_h & 0 & 0 \\ 0 & 1 & 0 & 0 \\ 0 & 0 & 1 & 0 \\ 0 & 0 & 0 & 1 \end{bmatrix} \begin{bmatrix} x' \\ y' \\ z' \\ 1 \end{bmatrix}. \quad (7)$$

Here, [x' y' z'] represents reconstructed mapping component coordinates associated with reconstructed vertex P' of the decoded attribute image and [x" y" z"] represents the refined mapping component coordinates associated with projected vertex P" of the refined attribute image.

Alternative, or in addition to, the attribute refinement filter in Eqn. (6), a 1- or 2-dimensional interpolation transformation filter, such as a bilinear interpolation transformation filter, a lanczos interpolation transformation filter, can be used to refine the face of the attribute component image corresponding to the degenerated face on the simplified topology. The parameters of the filter, such as the coefficients, positions, and size of the filter can be signaled in the coded mesh bitstream. For examples, the parameters can be signaled using supplemental enhancement information message or by indicating a filter index in a look-up table. The refined attribute component image can be used to reconstruct the mesh frames along with other decoded components as discussed above with respect to FIG. 2.

Figure 23:
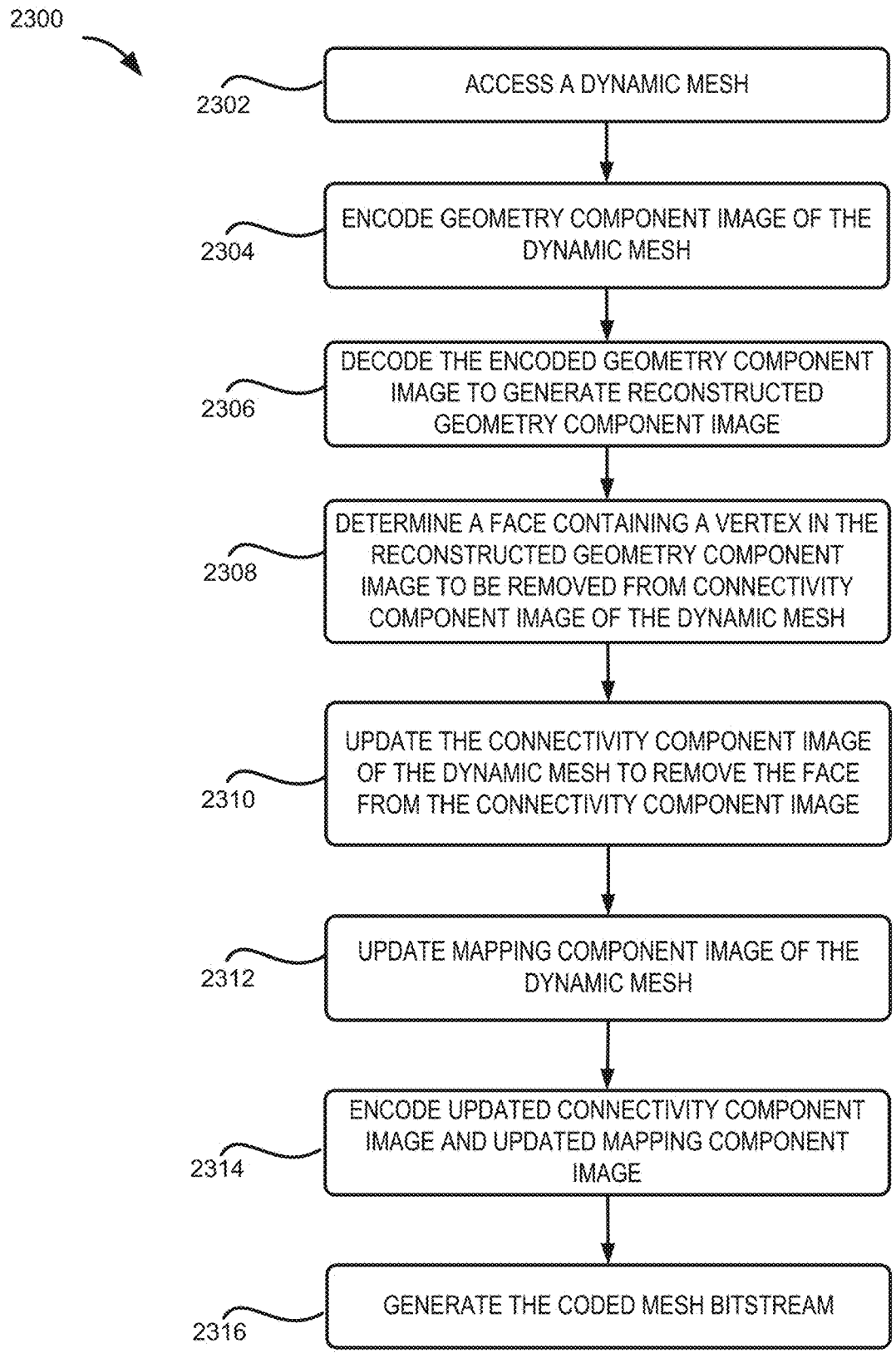
FIG. 23 depicts an example of a process for mesh coding with connectivity simplification and mapping adjustment without attribute adjustment, according to some embodiments of the present disclosure.

Referring now to FIG. 23, FIG. 23 depicts an example of a process 2300 for mesh coding with connectivity simplification and mapping adjustment without attribute adjustment, according to some embodiments of the present disclosure. One or more computing devices implement operations depicted in FIG. 2300 by executing suitable program code. For example, the encoder system 2100 in FIG. 21 may implement the operations depicted in FIG. 2300 by executing the corresponding program code. For illustrative purposes, the process 2300 is described with reference to some examples depicted in the figures. Other implementations, however, are possible.

At block 2302, the process 2300 involves accessing a dynamic mesh to be encoded. As discussed above, the dynamic mesh may be represented as uncompressed mesh frame sequence that include mesh frames. A mesh frame is a data format that describes 3D content (e.g., 3D objects) in a digital representation as a collection of geometry, connectivity, attribute, and attribute mapping information. Each mesh frame is characterized by a presentation time and duration. A mesh frame sequence (e.g., sequence of mesh frames) forms a dynamic mesh video. The uncompressed mesh frame sequence can be segmented into segmented mesh data. Based on the segmented mesh data, the encoder system 2100 can generate attribute component images, geometry component images, connectivity component images, and mapping component images.

At block 2304, the process 2300 involves encoding the geometry component images using a video encoder to generate a geometry component bitstream as described in detail with respect to FIG. 1. At block 2306, the process 2300 involves decoding the encoded geometry component images to generate reconstructed geometry component images. The decoding is performed using a video decoder that corresponds to the video encoder used to the encode the geometry component images. As discussed above, in examples where the video encoder (e.g., video encoder 120b) is a lossy encoder, due to prediction and quantization, the reconstructed geometry component images will be different from the geometry component images. As such, the reconstructed position of the decoded vertexes of the mesh may differ from the original position of the vertexes of the mesh. As a result, neighboring faces may degenerate into simplified geometry.

At block 2308, the process 2300 involves determining a face containing a vertex in the reconstructed geometry component images to be removed from connectivity component images of the dynamic mesh. At block 2310, the process 2300 involves updating the connectivity component images of the dynamic mesh to simplify the connectivity information. Blocks 2308 and 2310 are similar to block 1408 and block 1410, respectively, described with regard to FIG. 14.

At block 2312, the process 2300 involves updating the mapping component images of the dynamic mesh. As discussed above in detail with respect to FIG. 21, the encoder system 2100 can update the mapping component images by adjusting mapping coordinates associated with the vertices for the simplified connectivity.

At block 2314, the process 2300 involves encoding the updated connectivity component images to generate a connectivity component bitstream and encoding the updated mapping component images to generate a mapping component bitstream. As discussed above in detail with respect to FIG. 1, the encoding may involve using video encoders to generate the respective component bitstreams. At block 2316, the process 2300 involves generating a coded mesh bitstream by including at least the geometry component bitstream, the connectivity component bitstream, and the mapping component bitstream. For example, the coded mesh bitstream can be generated by multiplexing the mesh bitstream payload, that includes the encoded component bitstreams with a mesh bitstream header.

Figure 24:
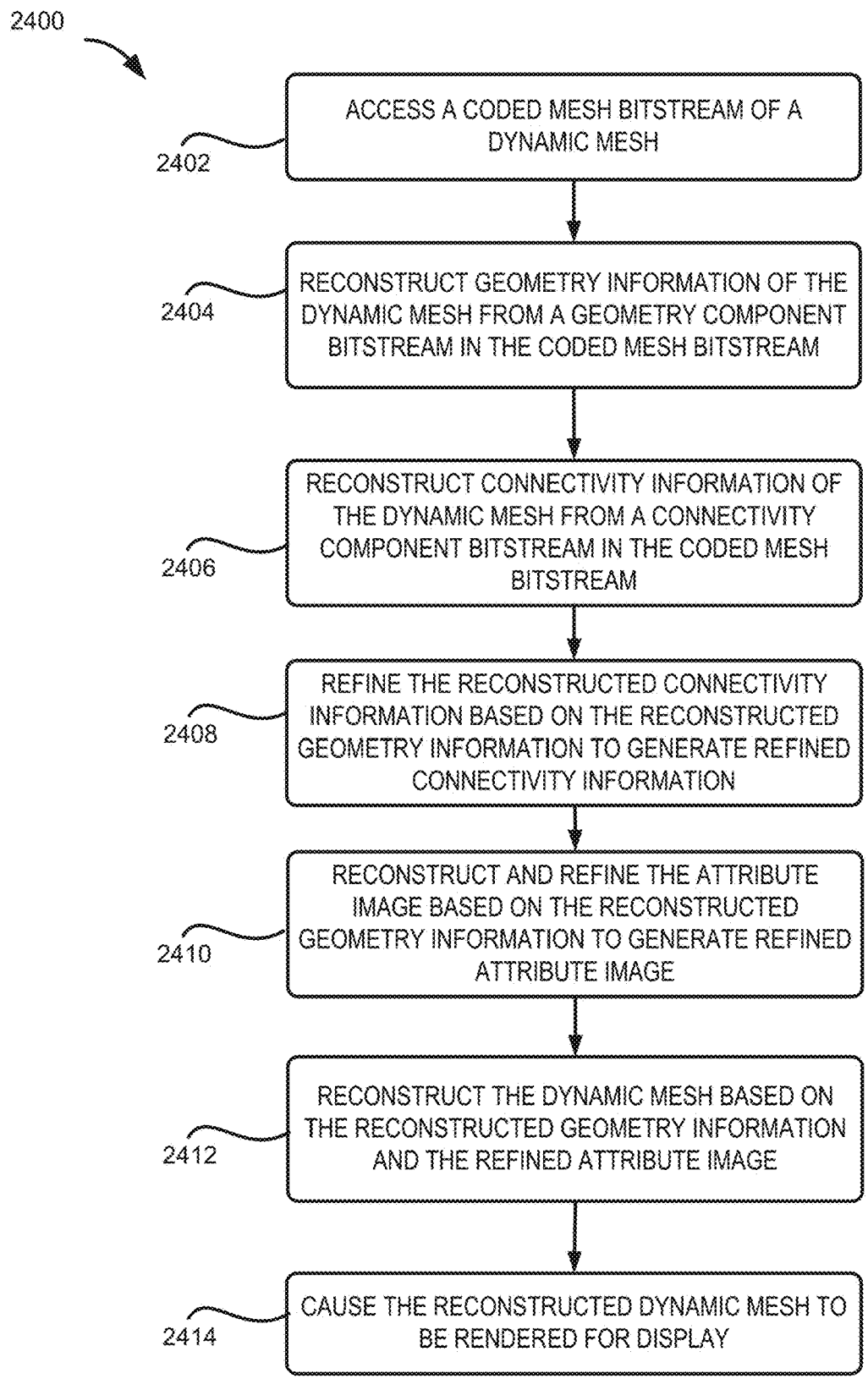
FIG. 24 depicts an example of a process for decoding a coded mesh bitstream with connectivity refinement, mapping refinement, and attribute refinement, according to some embodiments of the present disclosure.

Referring now to FIG. 24, FIG. 24 depicts an example of a process 2400 for decoding a coded mesh bitstream with connectivity refinement, mapping refinement, and attribute refinement, according to some embodiments of the present disclosure. One or more computing devices implement operations depicted in FIG. 2400 by executing suitable program code. For example, the decoder system 2200 in FIG. 22 may implement the operations depicted in FIG. 2400 by executing the corresponding program code. For illustrative purposes, the process 2400 is described with reference to some examples depicted in the figures. Other implementations, however, are possible.

At block 2402, the process 2400 involves accessing a coded mesh bitstream of a dynamic mesh for decoding. The coded mesh bitstream is encoded with connectivity simplification and mapping updates without attribute updates as described above with respect to FIG. 23. The coded mesh bitstream can include a geometry component bitstream, an attribute component bitstream, a connectivity component bitstream, and a mapping component bitstream.

At block 2404, the process 2400 involves reconstructing geometry information of the dynamic mesh from the geometry component bitstream in the coded mesh bitstream. The reconstructed geometry information includes data specifying vertices of the dynamic mesh. As discussed above in detail with respect to FIG. 2, the geometry information of the dynamic mesh can be reconstructed from the geometry component bitstream by applying a video decoder to the geometry component bitstream to generate reconstructed geometry component images which are then used to reconstruct the ordered list of vertex coordinates in the geometry information.

At block 2406, the process 2400 involves reconstructing connectivity information of the dynamic mesh from the connectivity component bitstream in the coded mesh bitstream. At block 2408, the process 2400 involves refining the reconstructed connectivity information based on the reconstructed geometry information to generate refined connectivity information. Blocks 2406 and 2408 are similar to block 1506 and block 1508, respectively, described with regard to FIG. 15.

At block 2410, the process 2400 involves reconstructing the attribute image from the attribute component bitstream and refining the reconstructed attribute image. As discussed above in detail with respect to FIG. 2, the attribute component image of the dynamic mesh can be reconstructed from the attribute component bitstream by applying a video decoder to the attribute component bitstream to generate reconstructed attribute image. The reconstructed attribute image can be refined by applying an inverse transformation on the face corresponding to a degenerated face in the connectivity information. The transformation can be estimated based on the decoded vertex in the geometry information and the reconstructed projected vertex in the geometry information.

At block 2412, the process 2400 involves reconstructing the dynamic mesh based on the reconstructed geometry information, the refined connectivity information, and the refined attribute image as well as other information including the decoded attribute information and so on. At block 2414, the process 2400 involves causing the reconstructed dynamic mesh to be rendered for display. For example, the reconstructed dynamic mesh can be transmitted to a device or a module configured to render the 3D object represented by the reconstructed dynamic mesh to generate rendered images or video for display.

Computing System Example

Figure 25:
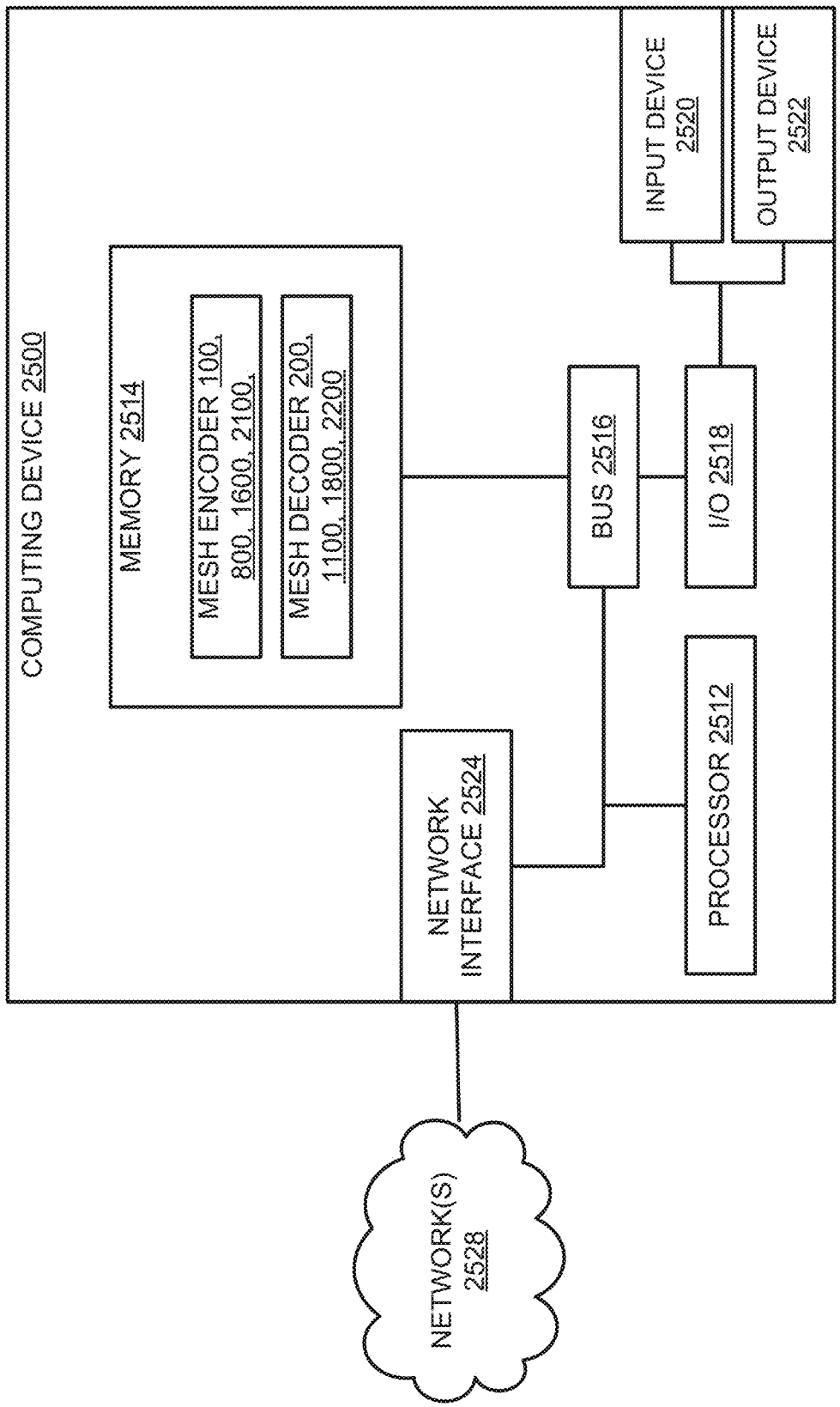
FIG. 25 depicts an example of a computing system that can be used to implement some embodiments of the present disclosure.

Any suitable computing system can be used for performing the operations described herein. For example, FIG. 25 depicts an example of a computing device 2500 that can implement the mesh encoder 100 of FIG. 1, the mesh decoder 200 of FIG. 2, the mesh encoder 800 of FIG. 8, the mesh decoder 1100 of FIG. 11, the mesh encoder 1600 of FIG. 16, the mesh decoder 1800 of FIG. 18, the mesh encoder 2100 of FIG. 21, the mesh decoder 2200 of FIG. 22. In some embodiments, the computing device 2500 can include a processor 2512 that is communicatively coupled to a memory 2514 and that executes computer-executable program code and/or accesses information stored in the memory 2514. The processor 2512 may comprise a microprocessor, an application-specific integrated circuit ("ASIC"), a state machine, or other processing device. The processor 2512 can include any of a number of processing devices, including one. Such a processor can include or may be in communication with a computer-readable medium storing instructions that, when executed by the processor 2512, cause the processor to perform the operations described herein.

The memory 2514 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 2500 can also include a bus 2516. The bus 2516 can communicatively couple one or more components of the computing device 2500. The computing device 2500 can also include a number of external or internal devices such as input or output devices. For example, the computing device 2500 is shown with an input/output ("I/O") interface 2518 that can receive input from one or more input devices 2520 or provide output to one or more output devices 2522. The one or more input devices 2520 and one or more output devices 2522 can be communicatively coupled to the I/O interface 2518. The communicative coupling can be implemented via any suitable manner (e.g., a connection via a printed circuit board, connection via a cable, communication via wireless transmissions, etc.). Non-limiting examples of input devices 2520 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 2522 include an LCD screen, an external monitor, a speaker, or any other device that can be used to display or otherwise present outputs generated by a computing device.

The computing device 2500 can execute program code that configures the processor 2512 to perform one or more of the operations described above with respect to FIGS. 1-24. The program code can include the mesh encoder 100 of FIG. 1, the mesh decoder 200 of FIG. 2, the mesh encoder 800 of FIG. 8, the mesh decoder 1100 of FIG. 11, the mesh encoder 1600 of FIG. 16, the mesh decoder 1800 of FIG. 18, the mesh encoder 2100 of FIG. 21, the mesh decoder 2200 of FIG. 22. The program code may be resident in the memory 2514 or any suitable computer-readable medium and may be executed by the processor 2512 or any other suitable processor.

The computing device 2500 can also include at least one network interface device 2524. The network interface device 2524 can include any device or group of devices suitable for establishing a wired or wireless data connection to one or more data networks 2528. Non-limiting examples of the network interface device 2524 include an Ethernet network adapter, a modem, and/or the like. The computing device 2500 can transmit messages as electronic or optical signals via the network interface device 2524.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for decoding a coded mesh bitstream of a dynamic mesh, the method comprising:
    reconstructing geometry information of the dynamic mesh from a geometry component bitstream in the coded mesh bitstream;
    reconstructing connectivity information of the dynamic mesh from a connectivity component bitstream in the coded mesh bitstream;
    refining reconstructed connectivity information based on reconstructed geometry information to generate refined connectivity information;
    reconstructing the dynamic mesh based on the reconstructed geometry information and the refined connectivity information; and
    rendering a reconstructed dynamic mesh for display,
    wherein refining the reconstructed connectivity information based on the reconstructed geometry information to generate the refined connectivity information comprises:
    identifying a vertex located inside a face specified by the reconstructed connectivity information based on the reconstructed geometry information; and
    dividing the face into two refined faces according to a location of the vertex to generate the refined connectivity information.

2. The computer-implemented method of claim 1, wherein the reconstructed connectivity information comprises data specifying faces of the dynamic mesh.

3. The computer-implemented method of claim 1, wherein a face of the dynamic mesh is a triangle.

4. The computer-implemented method of claim 1, wherein the vertex is specified in the reconstructed geometry information and is not listed as a vertex of any faces specified by the reconstructed connectivity information.

5. The computer-implemented method of claim 1, wherein dividing the face into the two refined faces according to the location of the vertex comprises:
    determining a projected vertex of the vertex on an edge of the face; and
    dividing the face into the two refined faces, wherein each of the two refined faces has the projected vertex as one vertex and has a same orientation as the face.

6. The computer-implemented method of claim 1, wherein the coded mesh bitstream comprises the geometry component bitstream, the connectivity component bitstream, an attribute component bitstream, and a mapping component bitstream.

7. The computer-implemented method of claim 1, wherein reconstructing the dynamic mesh based on the reconstructed geometry information and the refined connectivity information comprises:
    reconstructing the dynamic mesh based on the reconstructed geometry information, the refined connectivity information, and at least one of attribute information and mapping information.

8. A mesh decoder, comprising:
    a memory; and
    a processor communicatively coupled to the memory, wherein the processor is configured to execute computer-executable program codes stored in the memory to perform operations of:
    reconstructing geometry information of a dynamic mesh from a geometry component bitstream in a coded mesh bitstream;
    reconstructing connectivity information of the dynamic mesh from a connectivity component bitstream in the coded mesh bitstream;
    refining reconstructed connectivity information based on reconstructed geometry information to generate refined connectivity information;
    reconstructing the dynamic mesh based on the reconstructed geometry information and the refined connectivity information; and
    rendering a reconstructed dynamic mesh for display,
    wherein refining the reconstructed connectivity information based on the reconstructed geometry information to generate the refined connectivity information comprises:
    identifying a vertex located inside a face specified by the reconstructed connectivity information based on the reconstructed geometry information; and dividing the face into two refined faces according to a location of the vertex to generate the refined connectivity information.

9. The mesh decoder of claim 8, wherein the reconstructed connectivity information comprises data specifying faces of the dynamic mesh.

10. The mesh decoder of claim 8, wherein a face of the dynamic mesh is a triangle.

11. The mesh decoder of claim 8, wherein the vertex is specified in the reconstructed geometry information and is not listed as a vertex of any faces specified by the reconstructed connectivity information.

12. The mesh decoder of claim 8, wherein dividing the face into the two refined faces according to the location of the vertex comprises:
   determining a projected vertex of the vertex on an edge of the face; and
   dividing the face into the two refined faces, wherein each of the two refined faces has the projected vertex as one vertex and has a same orientation as the face.

13. The mesh decoder of claim 8, wherein the coded mesh bitstream comprises the geometry component bitstream, the connectivity component bitstream, an attribute component bitstream, and a mapping component bitstream.

14. The mesh decoder of claim 8, wherein reconstructing the dynamic mesh based on the reconstructed geometry information and the refined connectivity information comprises:
   reconstructing the dynamic mesh based on the reconstructed geometry information, the refined connectivity information, and at least one of attribute information and mapping information.

* * * * *